(12) United States Patent
Quek

(10) Patent No.: US 10,352,095 B2
(45) Date of Patent: Jul. 16, 2019

(54) FLOOD BARRIER

(71) Applicant: Parafoil Design & Engineering Pte Ltd, Singapore (SG)

(72) Inventor: Jwee Thiam Quek, Singapore (SG)

(73) Assignee: Parafoil Design & Engineering Pte Ltd, Singapore (SG)

( * ) Notice: Subject to any disclaimer, the term of this patent is extended or adjusted under 35 U.S.C. 154(b) by 0 days.

(21) Appl. No.: 15/527,810

(22) PCT Filed: Nov. 18, 2014

(86) PCT No.: PCT/SG2014/000544
§ 371 (c)(1),
(2) Date: May 18, 2017

(87) PCT Pub. No.: WO2016/080905
PCT Pub. Date: May 26, 2016

(65) Prior Publication Data
US 2017/0321475 A1    Nov. 9, 2017

(51) Int. Cl.
*E06B 9/02* (2006.01)
*E02B 7/54* (2006.01)
*E04H 9/14* (2006.01)
*E06B 9/00* (2006.01)

(52) U.S. Cl.
CPC .......... *E06B 9/02* (2013.01); *E02B 7/54* (2013.01); *E04H 9/145* (2013.01); *E06B 2009/007* (2013.01); *Y02A 50/14* (2018.01)

(58) Field of Classification Search
CPC ........................................... E06B 9/02
USPC ............................. 405/90, 98–100
See application file for complete search history.

(56) References Cited

U.S. PATENT DOCUMENTS

| 4,582,451 A | 4/1986 | Hollander, Jr. |
| 5,077,945 A * | 1/1992 | Koeniger ............ E06B 9/00 405/114 |
| 7,523,589 B1 | 4/2009 | Smith |
| 2003/0082007 A1 | 5/2003 | Liou |
| 2004/0200169 A1 | 10/2004 | Hung |

(Continued)

FOREIGN PATENT DOCUMENTS

| CN | 203219814 U | 10/2013 |
| CN | 103384745 A | 11/2013 |

(Continued)

OTHER PUBLICATIONS

International Search Report (Form PCT/ISA/210) for International Patent Application No. PCT/SG2014/000544, issued from the Japan Patent Office, dated Feb. 3, 2015, 3 pages.

(Continued)

*Primary Examiner* — Tara Mayo-Pinnock
(74) *Attorney, Agent, or Firm* — Kilyk & Bowersox, P.L.L.C.

(57) ABSTRACT

A flood barrier (100) is disclosed, which comprises at least two supporting posts (104a, 104b) for positioning at an entrance (102) of a building; and at least one panel (108) removably arranged intermediate a pair of the supporting posts to form the flood barrier, wherein the panel includes a plurality of seals having corrugated surfaces to interface with the supporting posts to provide a water-tight arrangement against entry of flood waters into the building. A method of operating said flood barrier is also disclosed.

20 Claims, 26 Drawing Sheets

(56) References Cited

U.S. PATENT DOCUMENTS

| | | | |
|---|---|---|---|
| 2011/0018205 A1 | 1/2011 | Nelson | |
| 2011/0232850 A1 | 9/2011 | Hartwell et al. | |
| 2013/0209173 A1 | 8/2013 | Quek | |
| 2015/0204040 A1* | 7/2015 | Knezevich | E04H 9/145 |
| | | | 405/114 |

FOREIGN PATENT DOCUMENTS

| | | | |
|---|---|---|---|
| CN | 104060583 A | 9/2014 | |
| EP | 1384847 A2 | 1/2004 | |
| JP | H01164398 U | 11/1989 | |
| JP | H01164400 U | 11/1989 | |
| JP | H0577685 U | 10/1993 | |
| JP | H10159195 A | 6/1998 | |
| JP | 3091240 U | 1/2003 | |
| JP | 2003321980 A | 11/2003 | |
| JP | 2004068271 A | 3/2004 | |
| JP | 2005042389 A | 2/2005 | |
| JP | 2006214178 A | 8/2006 | |
| JP | 2007217993 A | 8/2007 | |
| JP | 2008169561 A | 7/2008 | |
| JP | 2011069091 A | 4/2011 | |
| JP | 2011256642 A | 12/2011 | |
| TW | M353253 U | 3/2009 | |
| TW | M370649 U | 12/2009 | |

OTHER PUBLICATIONS

Written Opinion of the International Searching Authority (Form PCT/ISA/237) for International Patent Application No. PCT/SG2014/000544, issued from the Japan Patent Office, dated Feb. 3, 2015, 5 pages.

Notification of Transmittal of International Preliminary Report on Patentability (IPRP) (Form PCT/IPEA/416) for International Patent Application No. PCT/SG2014/000544, issued from the Japan Patent Office, bearing a mail date of Dec. 20, 2016, and IPRP (Form PCT/IPEA/409), 5 pages.

Supplementary Partial European Search Report for European Application No. EP 14906583.1, published by the European Patent Office (EPO), dated Aug. 3, 2018, including corresponding Communication, 1-page Annex, Information on Search Strategy, and 6-page EPO Form 1707.

Japanese Office Action Summary for Japanese Patent Application No. 2017-526960 issued by the Japan Patent Office, 2 pages.

The People's Republic of China Patent Office, Office Action for Chinese Patent Application No. CN201480084566.5, dated Jan. 16, 2019, with English-language translation.

The Intellectual Property Office Ministry of Economic Affairs, Office Action for Taiwanese Patent Application No. TW104136848, dated Jan. 14, 2019, including 1-page Search Report with English-language translation.

* cited by examiner

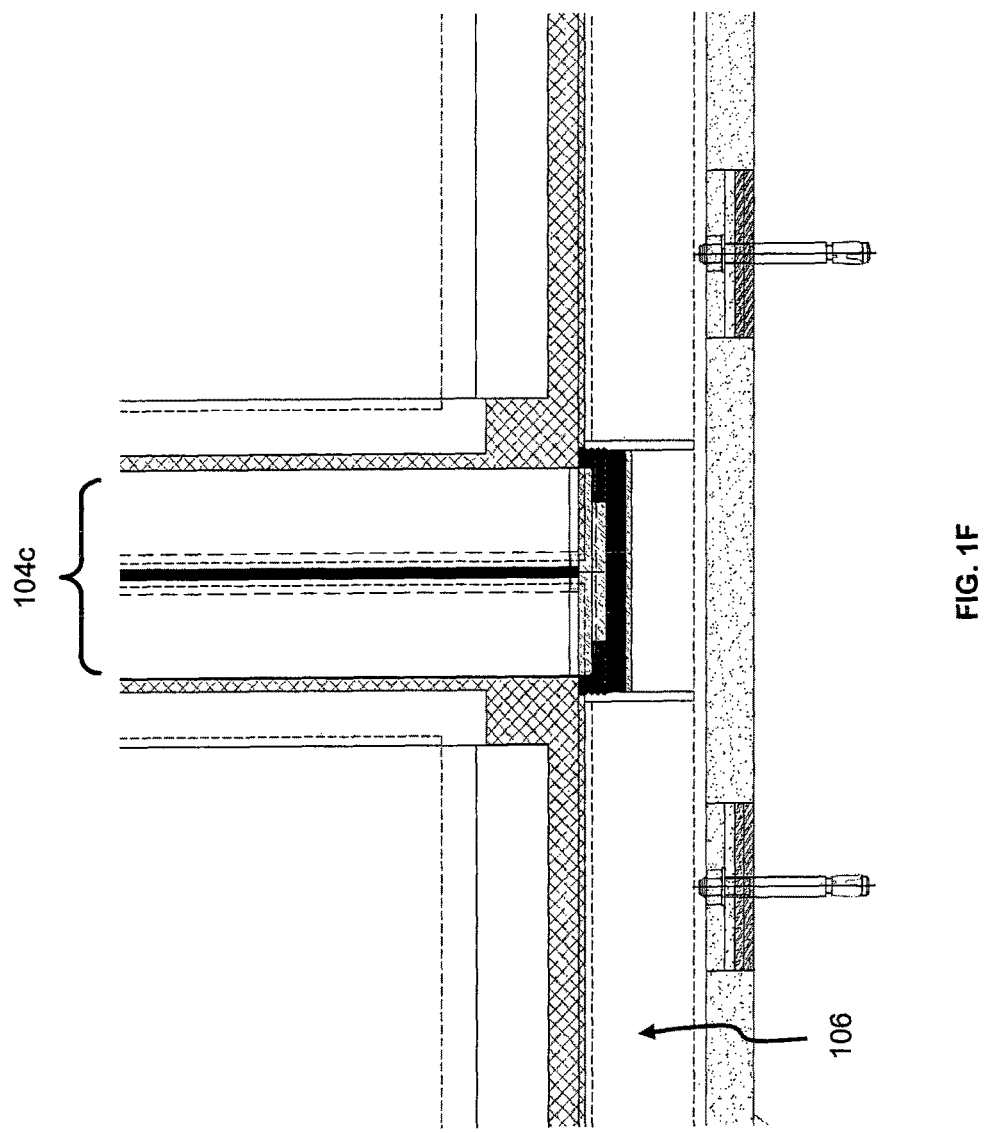

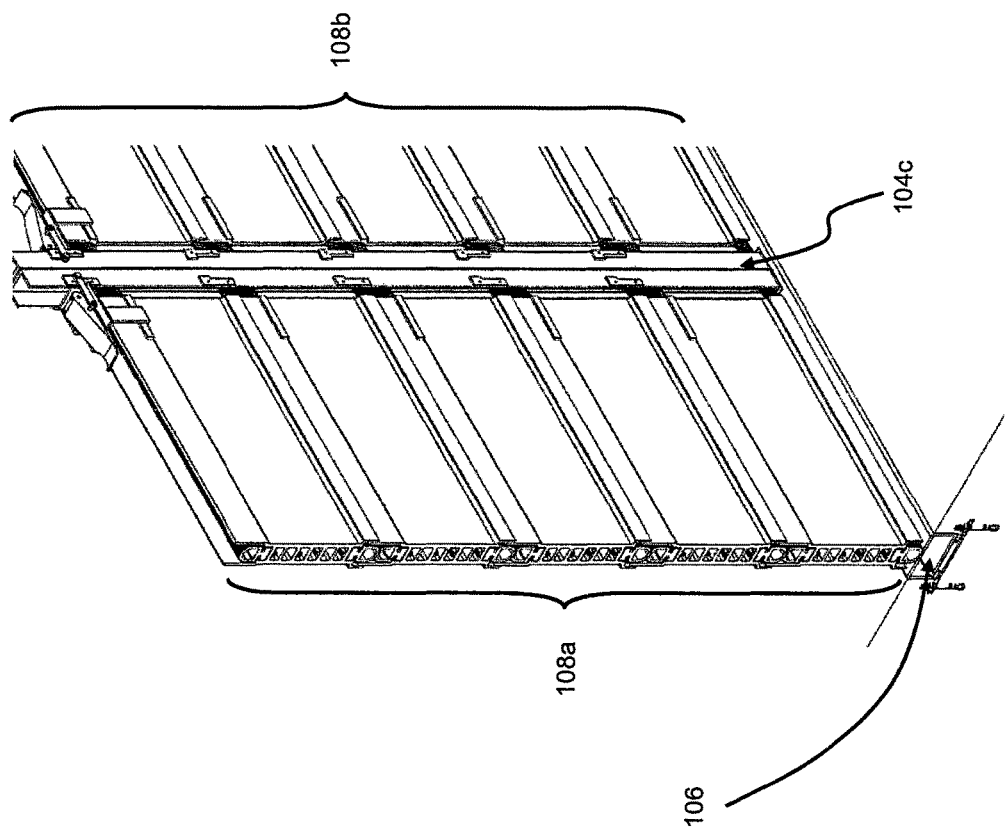

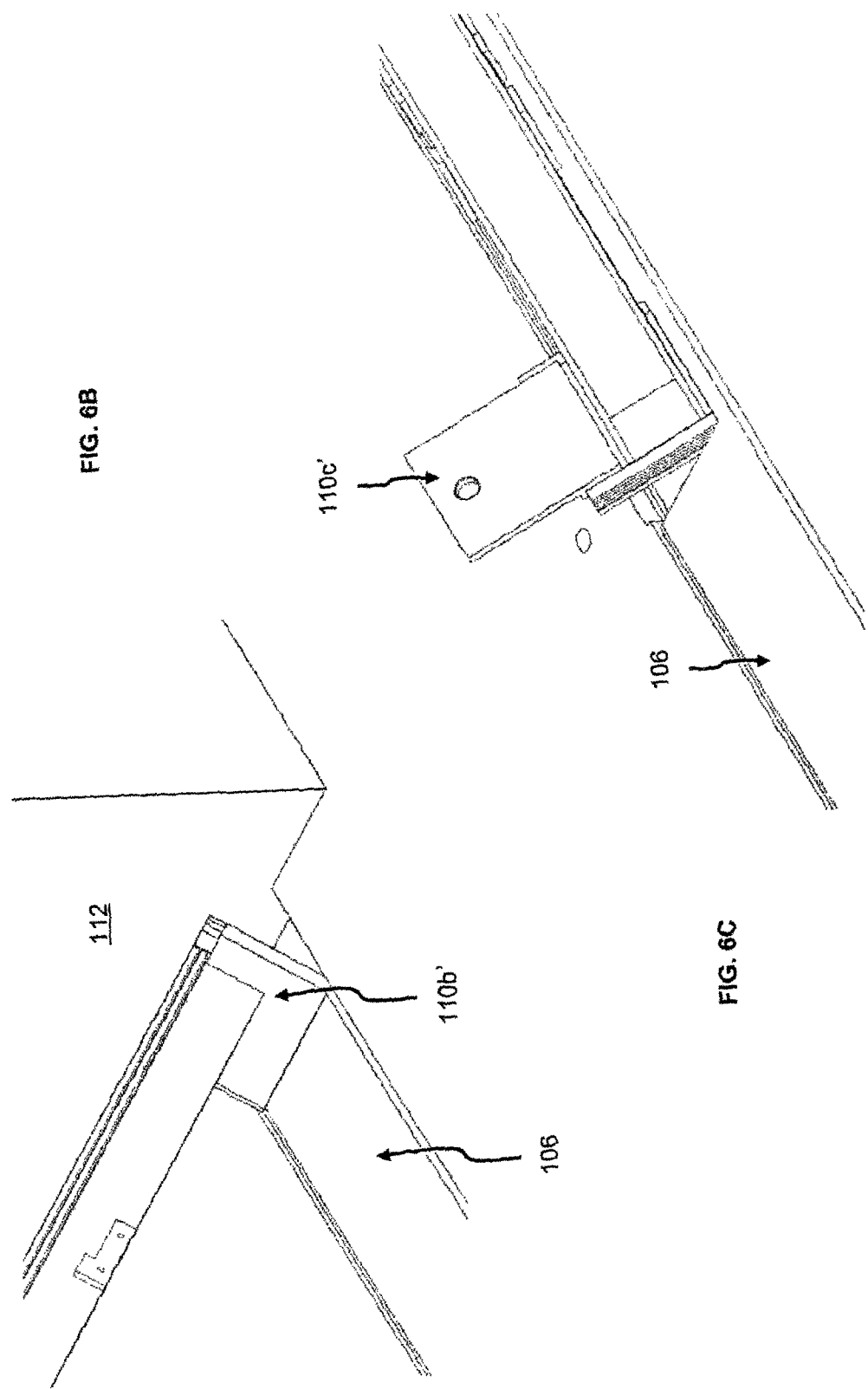

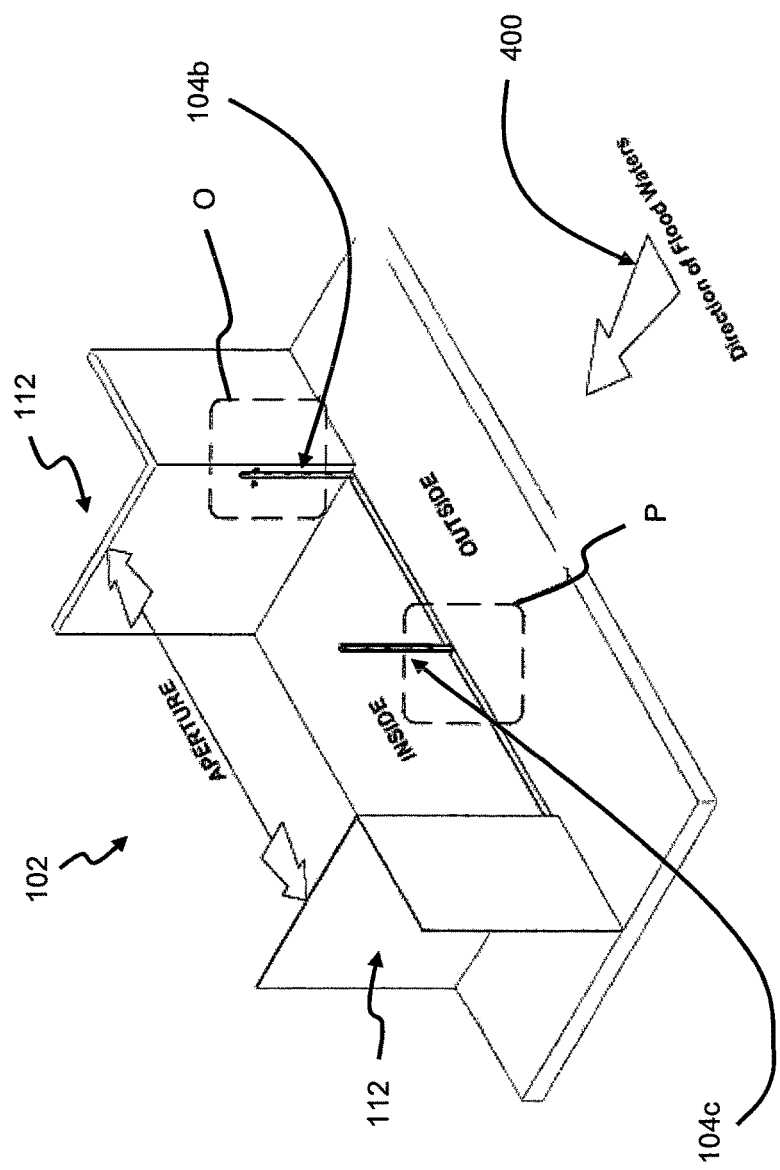

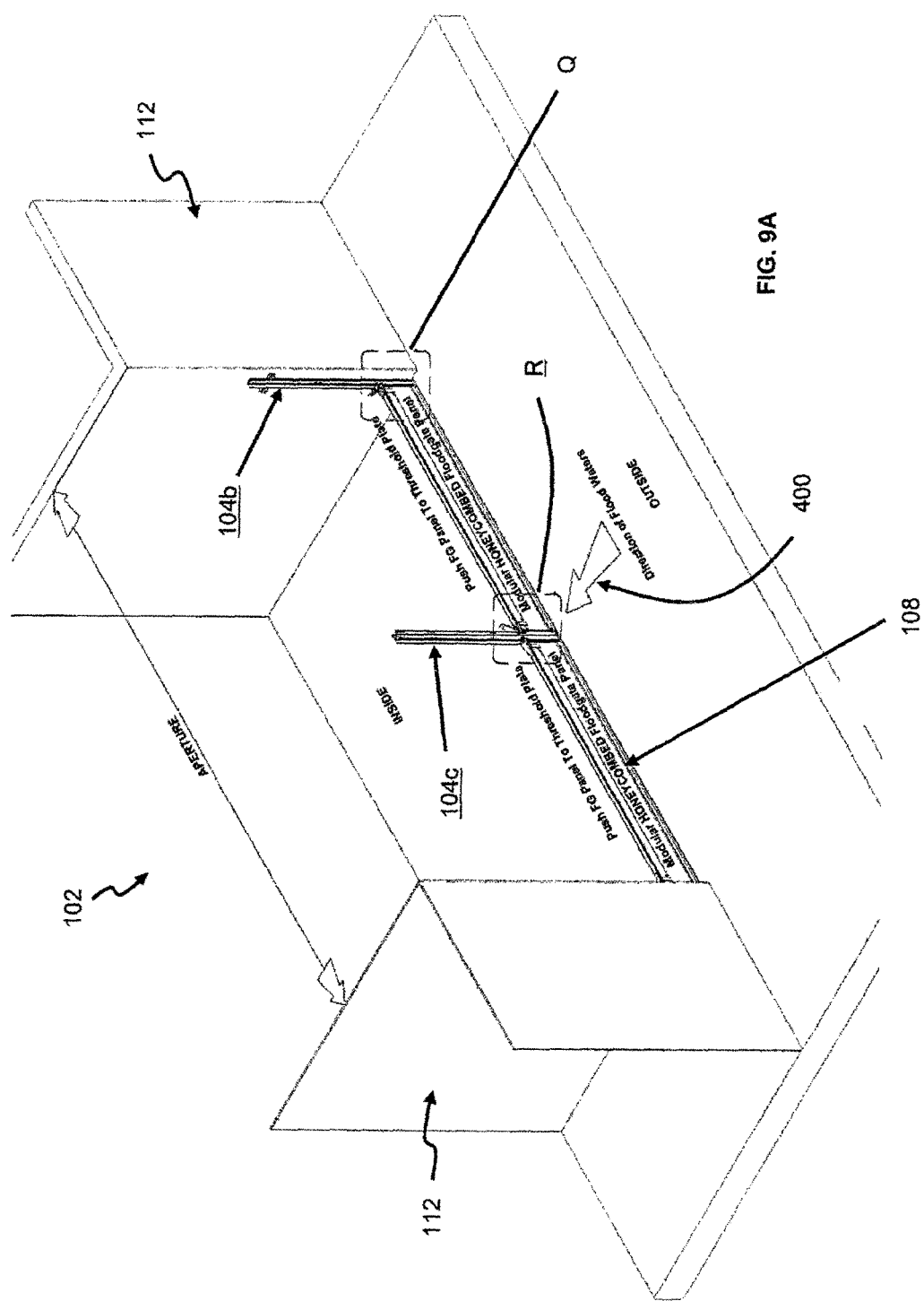

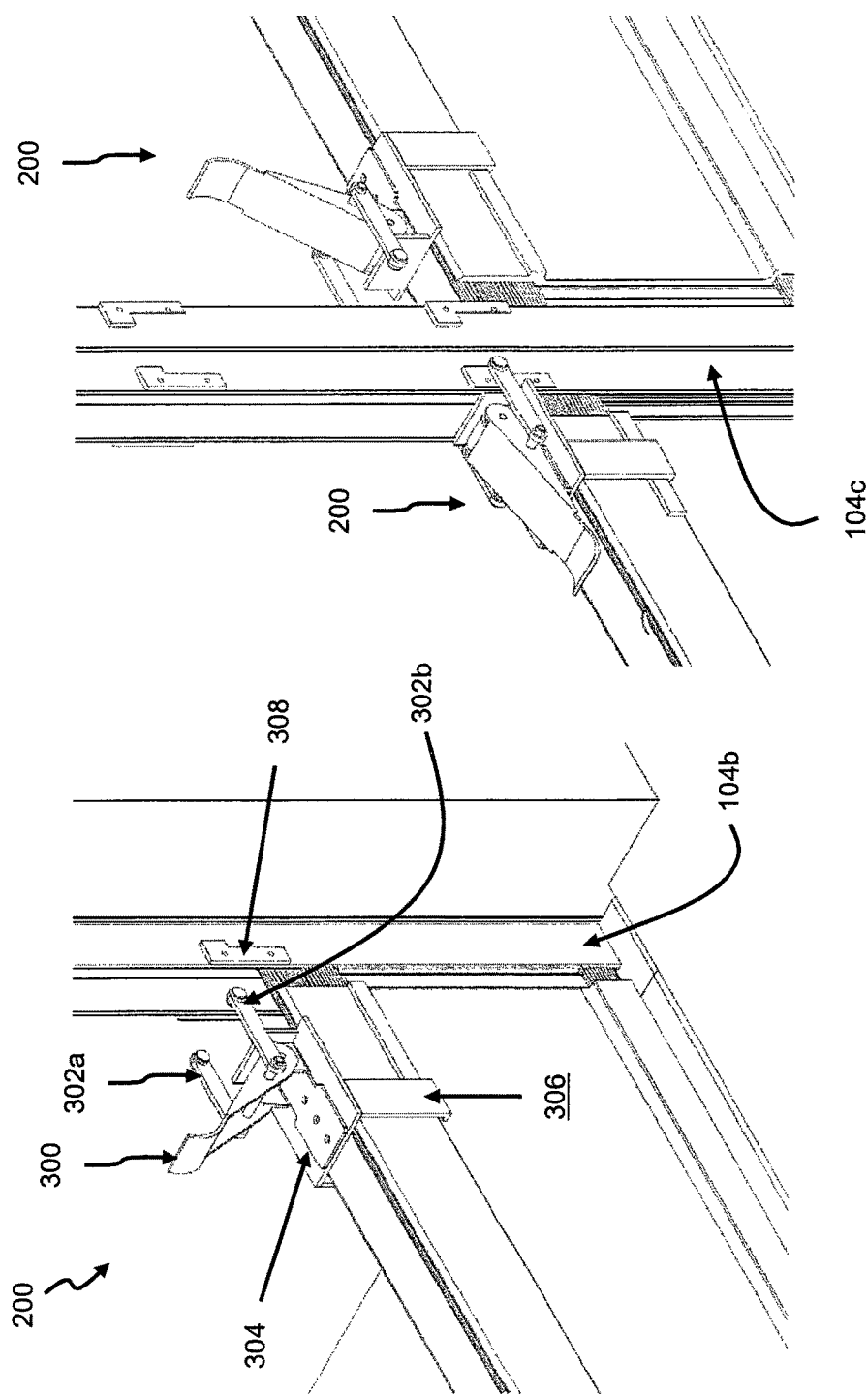

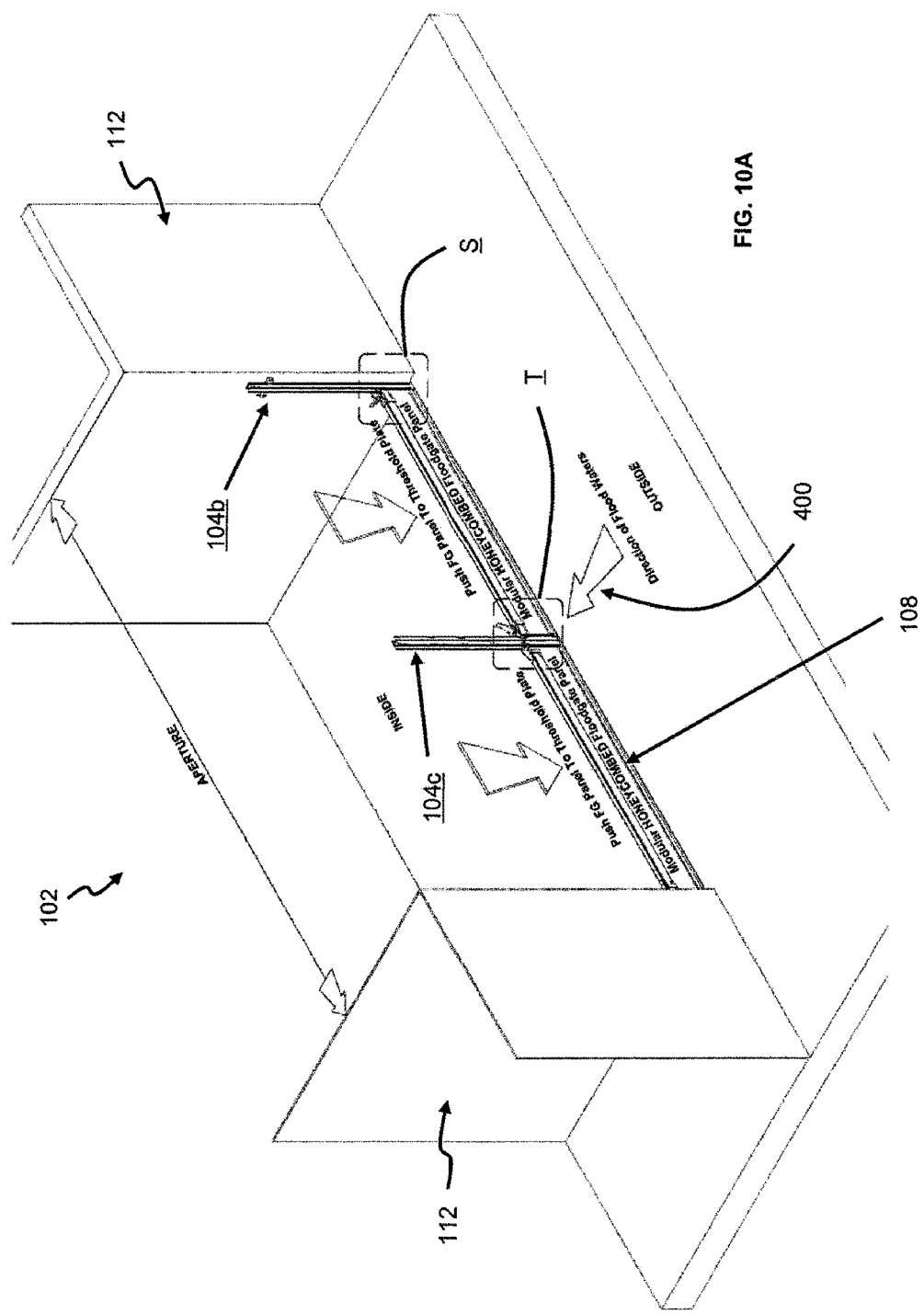

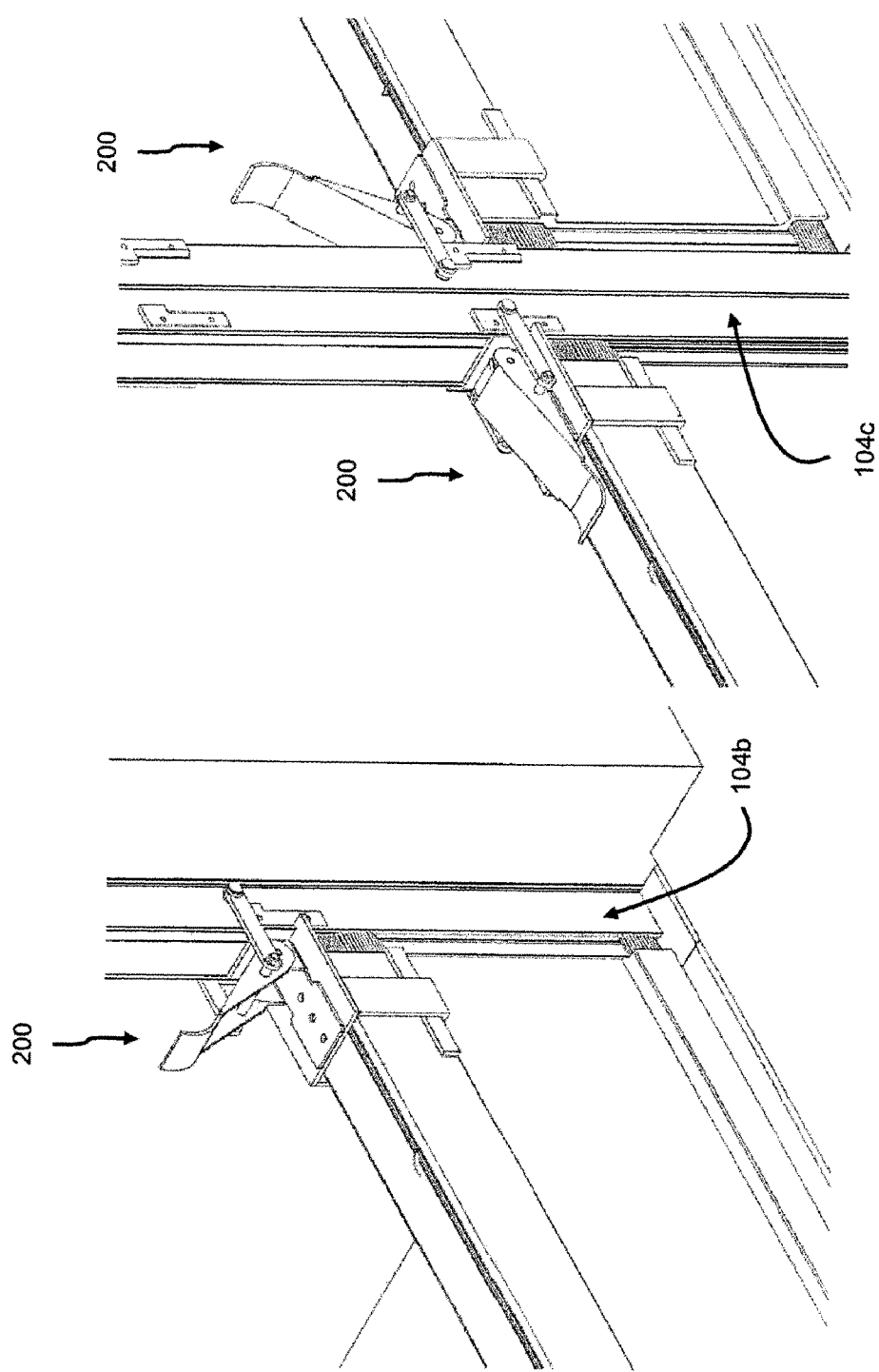

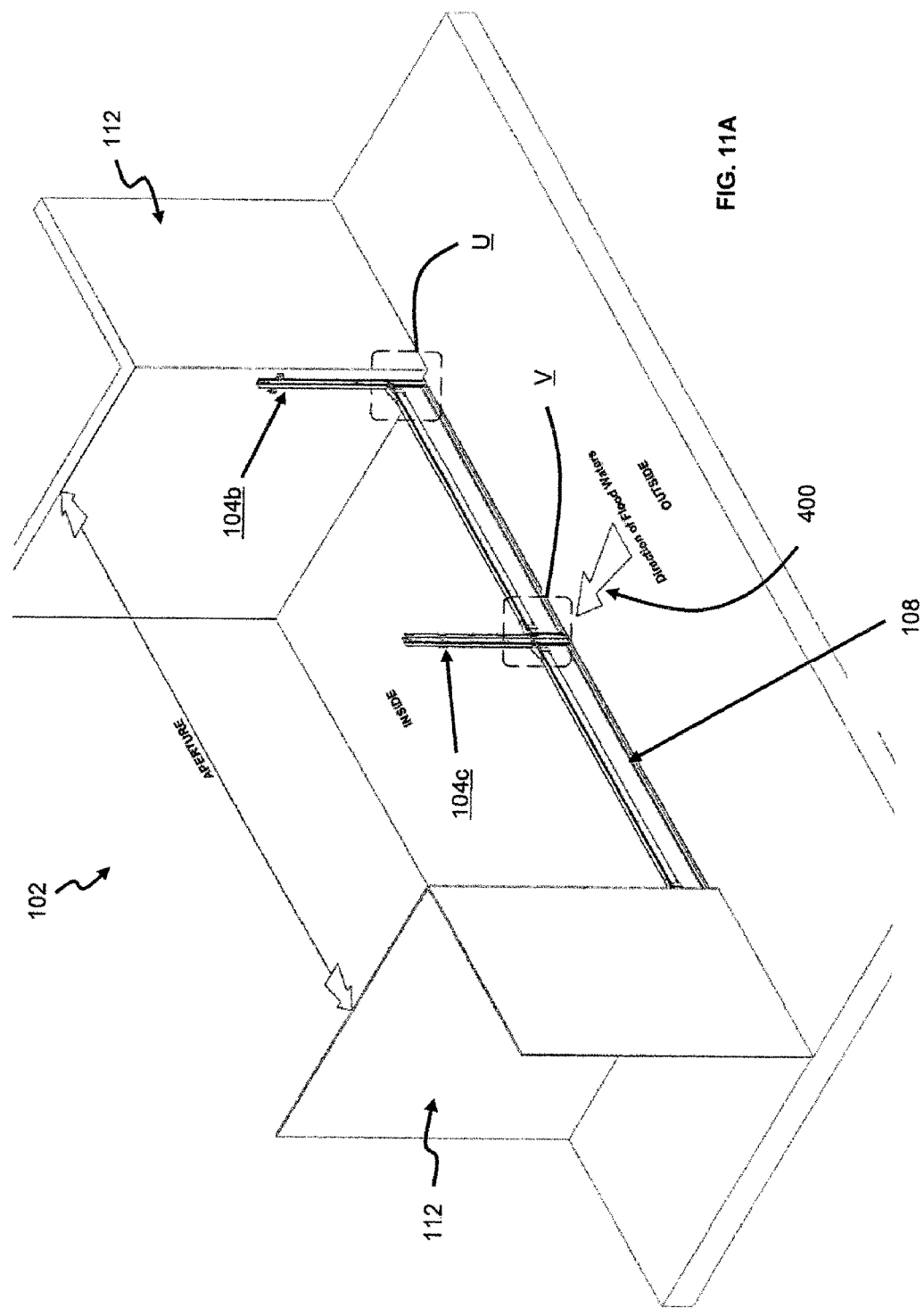

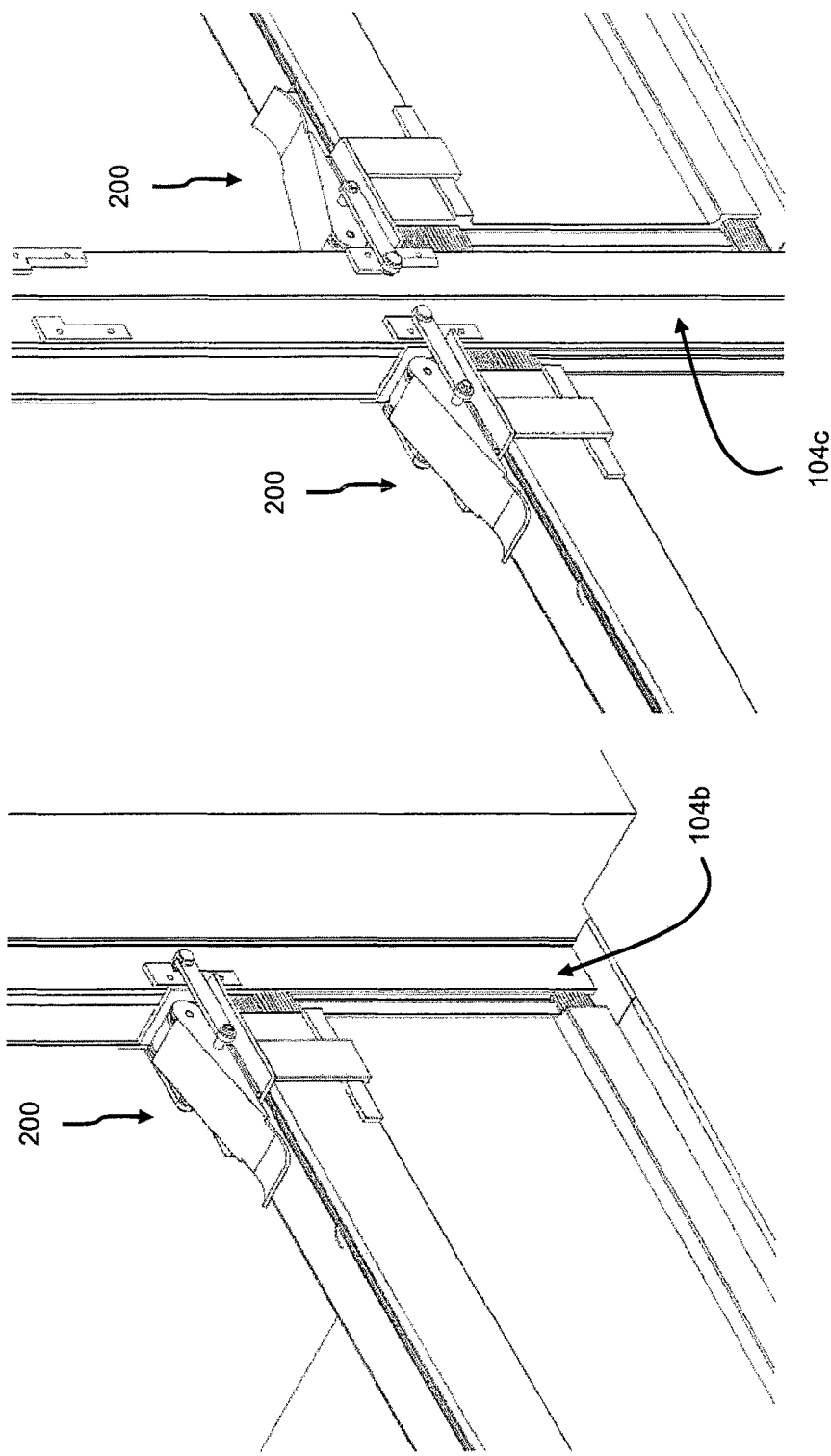

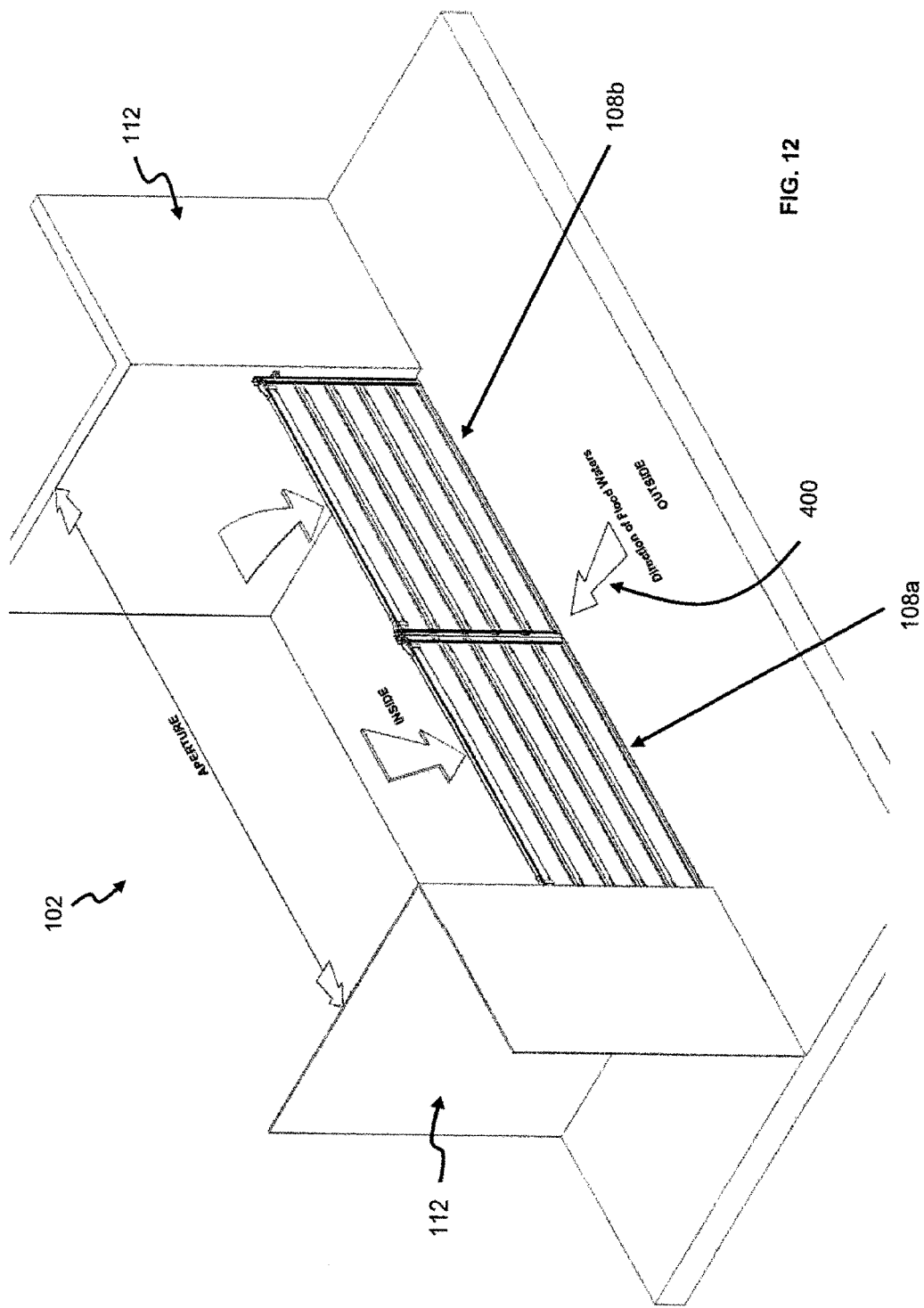

FLOOD BARRIER

FIELD & BACKGROUND

The present invention relates to a flood barrier and a method of operating the flood barrier.

Due to global warming, changes in rainfall weather patterns have been seen in many parts of the world. Some regions experienced prolonged droughts, while others have had intense, sudden rainstorms which tend to cause flash floods. A flash flood can be defined as: "a flood that rises and falls quite rapidly with little or no advance warning, usually as a result of intense rainfall over a relatively small area". Despite the proliferation of modern technologies, societies are still vulnerable to flash floods, especially so as more and more cities are becoming megacities and economies are increasingly nurtured by urbanization. Thus when flash floods occur, they can claim the lives of many people, as well as cause widespread damage to property and infrastructure, incurring economic losses.

A conventional measure typically adopted to cope with flash flooding by building wider drainage canals has however not been effective due to the unpredictability of rainfall patterns brought about by global warming, in terms of the amount of rainfall forecasted to be deposited over a region.

One object of the present invention is therefore to address at least one of the problems of the prior art and/or to provide a choice that is useful in the art.

SUMMARY

According to a $1^{st}$ aspect of the invention, there is provided a flood barrier comprising at least two supporting posts for positioning at an entrance of a building; and at least one panel removably arranged intermediate a pair of the supporting posts to form the flood barrier, wherein the panel includes a plurality of seals having corrugated surfaces to interface with the supporting posts to provide a water-tight arrangement against entry of flood waters into the building.

The proposed flood barrier is advantageous because the seals with corrugated surfaces present a plurality of barriers (acting on the related contact surfaces of the supporting posts) to protect against ingress of flood waters. Further, when pressure of the flood waters push against the panel, the seals also resiliently exert a higher force against the contact surfaces of the supporting posts resulting in an even tighter sealing with the supporting posts. Moreover, the corrugated surfaces help to reduce friction when the panel is being slotted into the supporting posts.

Preferably, the supporting posts may be adapted to be removable.

Preferably, each seal may have in a rest condition a generally D-shaped cross-sectional area. Each seal may be a Thermoplastic-Vulcanizers (TPV) Ethylene-Propylene-Diene-Monomer (EPDM) seal. Further, each seal may have an operating temperature range of between −40° C. and 130° C.

Preferably, the flood barrier may further comprise a pair of fasteners arranged to removably secure the panel to the supporting posts.

Preferably, each fastener may include a lever portion movably coupled to a hook portion, wherein in use the fasteners are arranged at opposing ends of the panel and the respective hook portions are engaged with respective hooking plates of the associated supporting posts, and the lever portions are operated to tension the hook portions to secure the panel to the supporting posts.

Preferably, the at least one panel may include a plurality of panels cooperatively arranged to form the flood barrier. The panel may be configured to withstand a maximum water pressure of 15.750 kg/m$^2$.

Also, each panel may preferably comprise a male portion and a female portion respectively arranged at opposing edges of said panel which are parallel to a longitudinal axis thereof. Preferably, the plurality of panels may each be configured to be removably attachable to another of the panels using the associated male and female portions.

Preferably, the plurality of seals may be arranged at edges of the associated panel. Moreover, the panel may internally be configured to have honeycombed-shaped structures. Yet preferably, the panel may be formed of extruded aluminium and is about 4 mm in thickness.

Preferably, the at least two supporting posts may also include first and second supporting posts, and at least one third supporting post for positioning intermediate the first and second supporting posts, whereby the panels are arranged to be received between pairs of the supporting posts to form the flood barrier. The third supporting post may be adapted to be removable.

Preferably, the flood barrier may further comprise a threshold plate for positioning at the floor of the entrance.

According to a $2^{nd}$ aspect of the invention, there is provided a method of operating a flood barrier which includes at least two supporting posts and at least one panel, the method comprising arranging the two supporting posts to be positioned at an entrance of a building; and removably arranging the panel intermediate a pair of the supporting posts to form the flood barrier, wherein the panel includes a plurality of seals having corrugated surfaces to interface with the supporting posts to provide a water-tight arrangement against entry of flood waters into the building.

According to a $3^{rd}$ aspect of the invention, there is provided a flood barrier comprising at least two supporting posts for positioning at an entrance of a building; at least one panel removably arranged intermediate a pair of the supporting posts to form the flood barrier; and a pair of fasteners, each fastener includes a lever portion movably coupled to a hook portion, wherein in use the fasteners are arranged at opposing ends of the panel and the respective hook portions are engaged with respective hooking plates of the associated supporting posts, and the lever portions are operated to tension the hook portions to secure the panel to the supporting posts.

It is to be appreciated that using the fasteners is to push seals with corrugated surfaces (provided on lengthwise edges of the panel) in a direction towards the floor of the entrance.

According to a $4^{th}$ aspect of the invention, there is provided a method of operating a flood barrier which includes at least two supporting posts, at least one panel and a pair of fasteners, each fastener includes a lever portion movably coupled to a hook portion, the method comprising arranging the two supporting posts to be positioned at an entrance of a building; removably arranging at least one panel intermediate a pair of the supporting posts to form the flood barrier; arranging the fasteners at opposing ends of the panel and engaging the respective hook portions with respective hooking plates of the associated supporting posts; and operating the lever portions to tension the hook portions to secure the panel to the supporting posts.

Preferably, the at least two supporting posts may include being arranged at the said entrance.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIG. 1F is an enlarged view of portion D of FIG. 1A;

FIG. 2E is an enlarged view of portion F' of FIG. 2D;

FIGS. 6B and 6C are respectively enlarged views of portions M and N of FIG. 6A;

FIG. 7A shows a third step of said method of operating the flood barrier;

FIG. 9A shows a fifth step of said method of operating the flood barrier;

FIGS. 9B and 9C are respectively enlarged views of portions Q and R of FIG. 9A;

FIG. 10A shows a sixth step of said method of operating the flood barrier;

FIGS. 10B and 10O are respectively enlarged views of portions S and T of FIG. 10A;

FIG. 11A shows a seventh step of said method of operating the flood barrier;

FIGS. 11B and 11C are respectively enlarged views of portions U and V of FIG. 11A; and FIG. 12 shows an eighth step of said method of operating the flood barrier.

DETAILED DESCRIPTION OF PREFERRED EMBODIMENTS

Figure 1A:
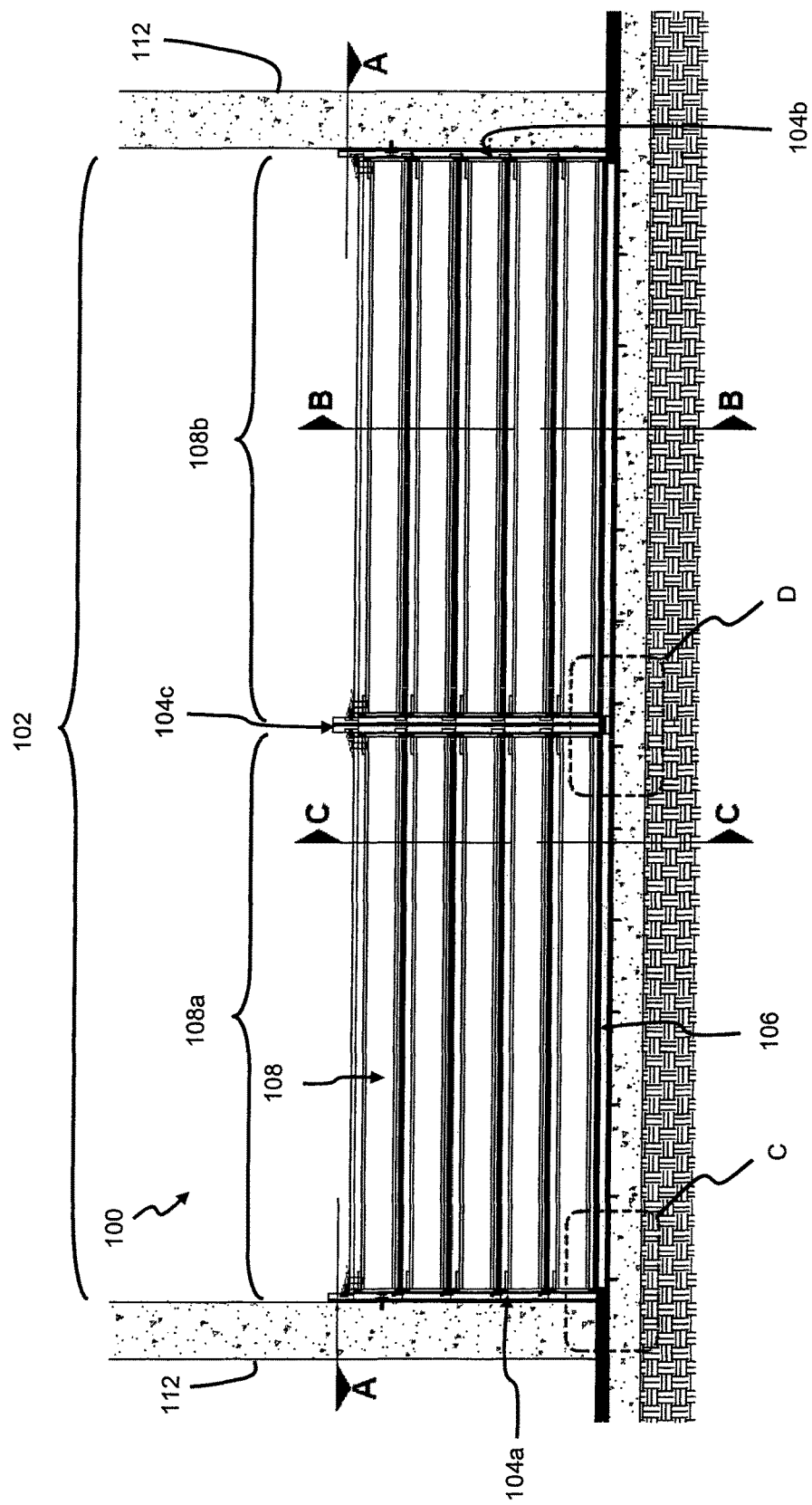
FIG. 1A is a front elevation view of a flood barrier, according to an embodiment.
Figure 1B:
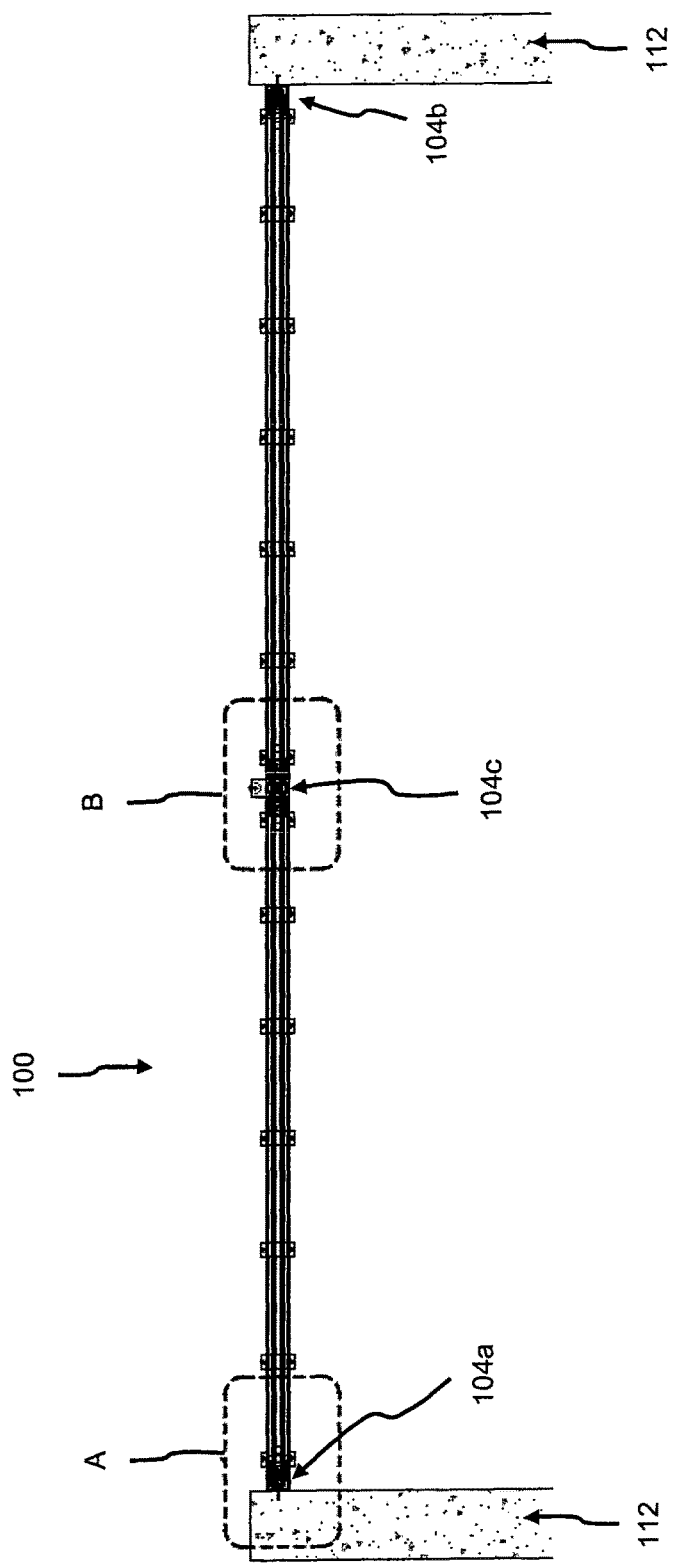
FIG. 1B is a cross-sectional view of the flood barrier taken along line A-A of FIG. 1A.

FIG. 1A shows a front elevation view of a proposed flood barrier 100 for protection against intruding flood waters, according to an embodiment. The flood barrier 100 may also be termed a manually stackable floodgate, for reasons which will be apparent from the description below. FIG. 1B is a cross-sectional view of the flood barrier 100 taken along line A-A of FIG. 1A. FIGS. 1C-1F highlight enlarged views of respective selected portions of FIGS. 1A and 1B. The flood barrier 100 is envisaged to be installable at entrances of a building to protect the building from flood waters, for example an entrance 102 as shown in FIG. 1A, but it is also to be appreciated that the flood barrier 100 may easily be installed into position at any installation as needed. Advantageously, the flood barrier 100 does not require use of multiple clamping/tightening devices typically associated with conventional flood barriers.

Specifically, the flood barrier 100 comprises the following components: at least two vertical (first and second) supporting posts (also known as stanchions) 104a, 104b, a threshold plate 106 (also known as base plate), and at least one modular floodgate panel 108 (hereinafter panel). It is to be appreciated that for this embodiment, the at least one panel 108 includes first and second sets of panels 108a, 108b but is not to be construed as limited solely to such an arrangement. In this instance, each set of panels 108a, 108b include five pieces of panels 108, but the number of panels 108 used in each set of panels 108a, 108b may flexibly differ (i.e. selective installation) in alternative embodiments to adapt to (changing) flood conditions, so long as the panels 108 to be installed can be supported by the supporting posts 104a, 1054b.

Figure 1C:
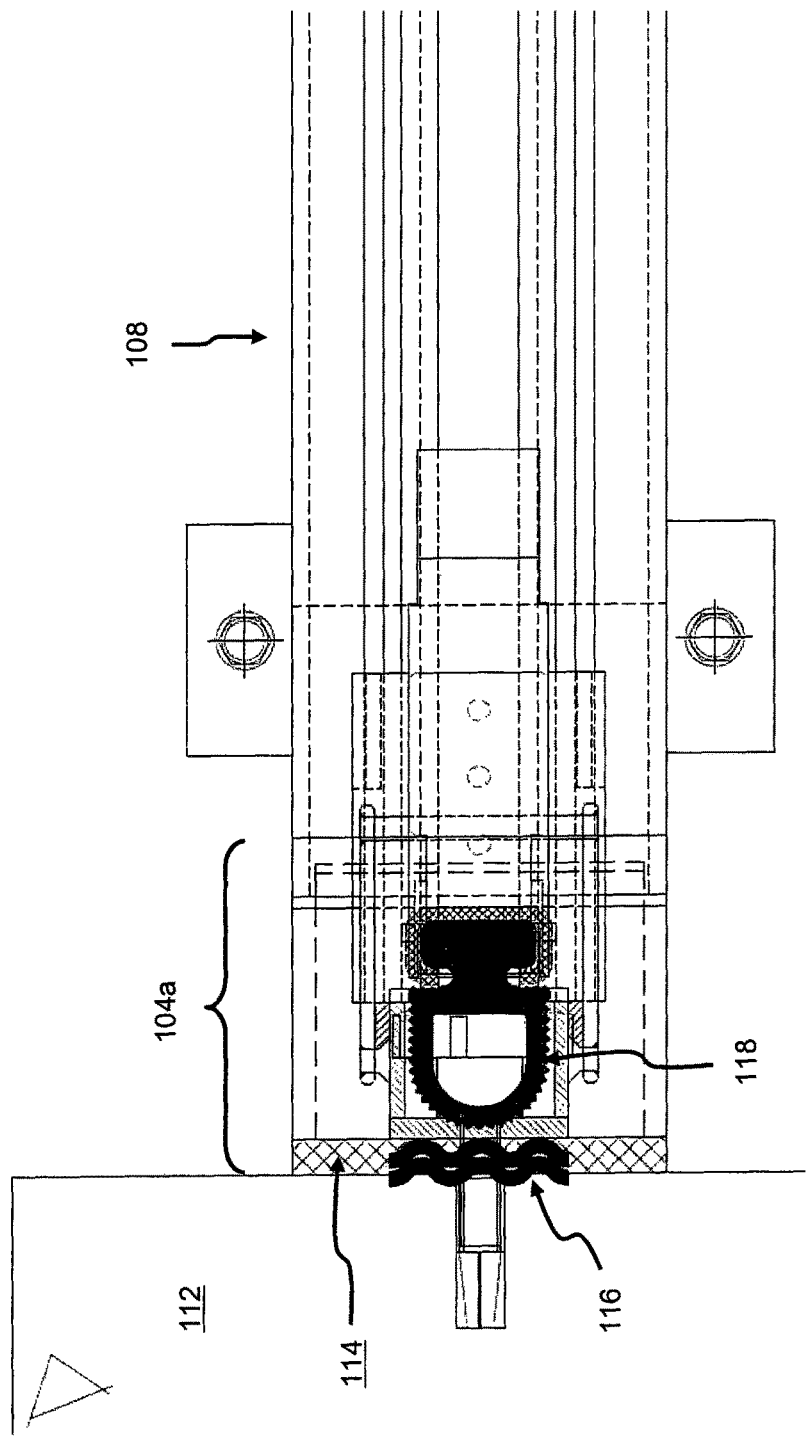
FIG. 1C is an enlarged view of portion A of FIG. 1B.
Figure 1D:
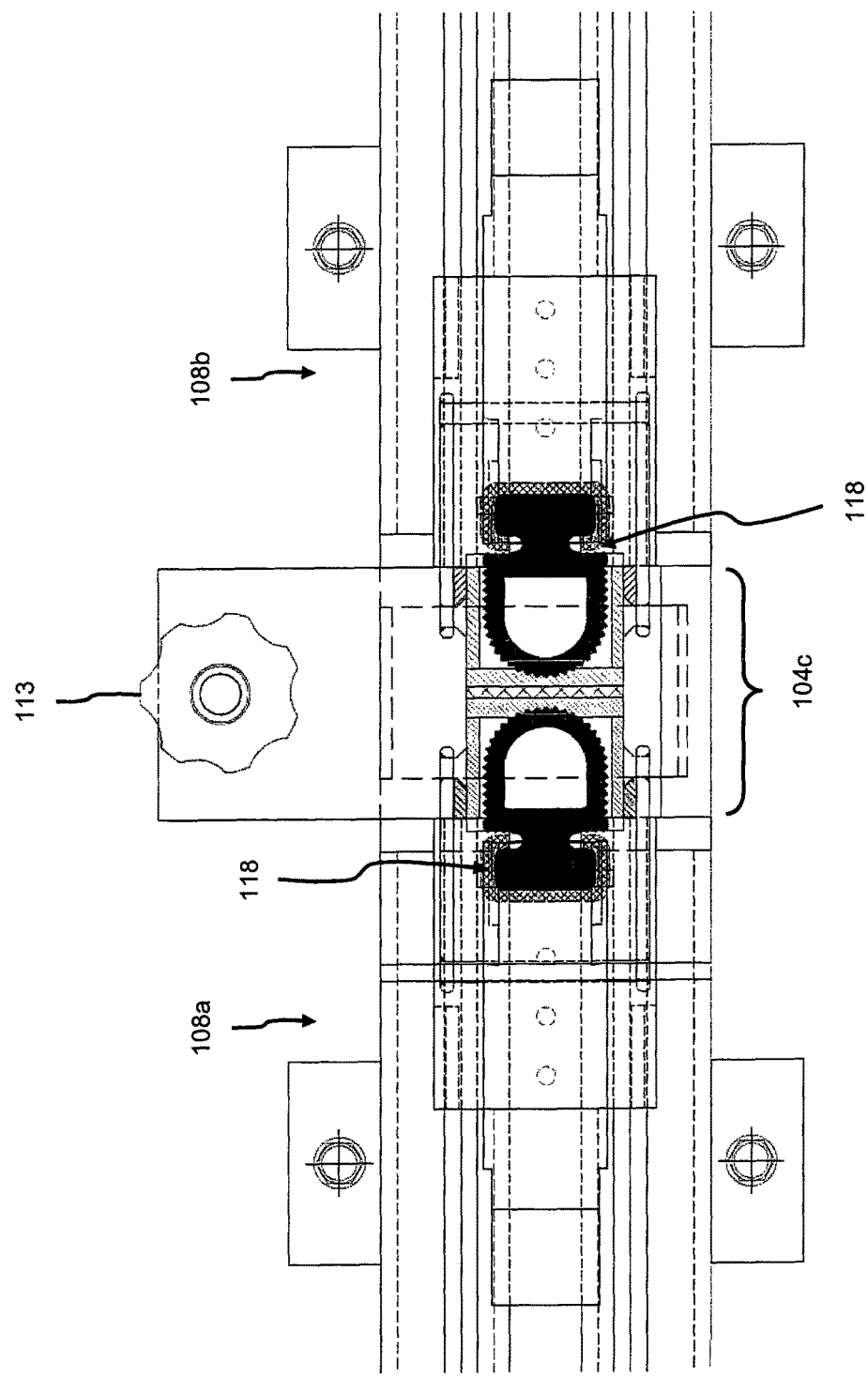
FIG. 1D is an enlarged view of portion B of FIG. 1B.
Figure 1E:
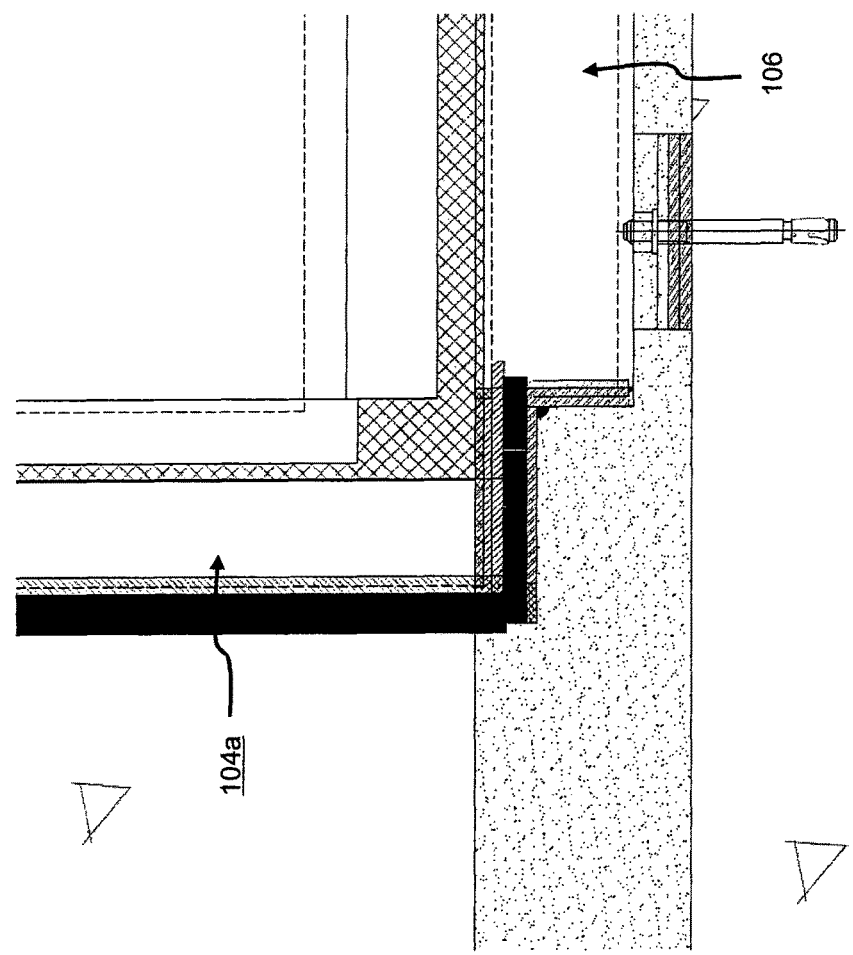
FIG. 1E is an enlarged view of portion C of FIG. 1A.

The threshold plate 106, which is formed (for example) of stainless steel, is arranged in a longitudinal recess located in the floor of the entrance 102, and is generally fixed in position using (for example) masonry anchors (i.e. not normally removed unless for maintenance purposes). In position, the threshold plate 106 is level with the floor. Specifically, the longitudinal recess is located across the width of the entrance 102, and so the threshold plate 106 is configured to extend the full width of the entrance 102, where the flood barrier 100 is to be deployed. The threshold plate 106 is also arranged at two opposing ends of its length with respective (first and second) cover plates 110a, 110b (see FIG. 4B) that may be flipped open for removal or closed. Each cover plate 110a, 110b has a substantially square shape, is made of stainless steel, and is provided with a notch to facilitate the removal thereof. When the cover plates 110a, 110b are removed, access to an associated portion of the recess (hidden underneath the respective cover plates 110a, 110b) is consequently permitted to allow the respective supporting posts 104a, 104b to be mounted. FIG. 1E is an enlarged view of portion C of FIG. 1A, showing the first supporting post 104a mounted to the floor at the recess exposed after removing the first cover plate 110a.

The supporting posts 104a, 104b are arranged to enable the panels 108a, 108b to be received intermediate the supporting posts 104a, 104b, by slotting the panels 108a, 108b between the supporting posts 104a, 104b. Particularly, the widthwise edges of the panels 108a, 108b guide the panels 108a, 108b during the slotting into slots in the supporting posts 104a, 104b. Of course, it is to be appreciated that a base panel 108, defined as the first panel to be received between the supporting posts 104a, 104b, abuts the threshold plate 106 via a lengthwise edge of the base panel 108, which is parallel to a longitudinal axis of the threshold panel 106.

The supporting posts 104a, 104b are adapted to be conveniently removable or permanently mounted in position to building structures, for example, walls (or columns) 112 of the entrance 102 shown in FIG. 1A. FIG. 1C is an enlarged view of portion A of FIG. 1B, viewed from the top of the first supporting post 104a, which is mounted to the wall 112. If the supporting posts 104a, 104b are mounted permanently to the walls 112, the supporting posts 104a, 104b are appropriately lined with a layer of silicone mastic sealant 114 to prevent ingress of flood waters via edges of the supporting posts 104a, 104b that interface with the walls 112. On the other hand, if the supporting posts 104a, 104b are configured to be removable, the supporting posts 104a, 104b are instead lined with multiple layers of seals 116 having corrugated surfaces to act against the walls 112 to form a water-tight arrangement, because the surface of the walls 112 may not be sufficiently flat to protect against ingress of flood waters into the entrance 102. The seals 116 used in this embodiment is Thermoplastic-Vulcanizers (TPV) type Ethylene-Propylene-Diene-Monomer (EPDM) seals (which has an operating temperature range of between −40° C. and 130° C.), but not to be construed as limiting since other suitable seals may also be used. In this instance, the TPV-type EPDM seals 116 are adopted for their strong resistance against UV rays/Ozone, as the flood barrier 100 will be deployed in outdoor environments. It is also to be appreciated that the seals 116 are not to be made of neoprene and/or any other water resistant membrane that are unable to withstand harsh environmental elements.

For this embodiment, the supporting posts 104a, 104b are removably secured to the walls 112 using hand-tightened threaded cross-knobs 113 (but other suitable securing means may also be used). For structural integrity, anti-corrosion and reduced-friction/smoothness properties, the two supporting posts 104a, 104b are made from stainless steel with a minimum thickness of 3 mm, rather than steel which may easily corrode, or aluminium which may easily be distorted/damaged.

Depending on a width of the entrance 102, an intermediate supporting post 104c may be required, since the width of the entrance 102 may significantly be wider than the configured length of each panel 108. This is case shown in FIG. 1A, where the intermediate supporting post 104c is arranged between the first and second supporting posts 104a, 104b. Similarly, the intermediate supporting post 104c is adapted to be conveniently removable or permanently mounted in position. If the intermediate supporting post 104c is arranged to be removable, the intermediate supporting post 104c is to be secured to the floor of the entrance 102 using also the hand-tightened threaded cross-knobs 113. In this embodiment, the threshold plate 106 also includes an intermediate cover plate 110c positioned centrally in the threshold plate 106 to enable the intermediate supporting post 104c to be mountable to the floor of the entrance 102 (i.e. see FIG. 1F showing an enlarged view of portion D of FIG. 1A). Particularly, as seen in FIG. 1A, the first supporting post 104a and the intermediate supporting post 104c cooperatively receive the first set of panels 108a, whereas the second supporting post 104b and the intermediate supporting post 104c cooperatively receive the second set of panels 108b. FIG. 1D is an enlarged view of portion B of FIG. 1B, showing a top view of the intermediate supporting post 104c received with the first and second sets of panels 108a, 108b. It is further to be appreciated that the base of the respective supporting posts 104a-104c are also lined with a layer of the TPV-type EPDM seals 116 to interface with the respective recesses (exposed after the cover plates 110a-110c are removed) in order to provide a water-tight arrangement.

Each individual panel 108 is generally rectangular in shape and made of extruded aluminium having a minimum thickness of about 4 mm. Moreover, each panel 108 has a length of about 2500 mm (i.e. 2.5 m), a width of about 220 mm and weighs about 22.8 kg. Each panel 108 is thus easily manageable by an operator lifting the panel 108 for installing between the supporting posts 104a-104c. It is to be appreciated that the above dimensions of the panel 108 are provided merely as an example for this embodiment and not to be construed as limiting; other suitable dimensions fit for use in the flood barrier 100 are also possible. In addition, each panel 108 is internally arranged to have honeycombed-shaped structures for structural integrity. The honeycombed-shaped structures are arranged with columnar structures, which advantageously result in the panel 108 having minimal density and relatively high out-of-plane compression and shear properties. Specifically, in this instance, the said columnar structures (of the honeycombed structures) are arranged to be in the form of 6 mm thick structural ribs for ensuring the structural integrity of the panel 108. It is to be appreciated that over a 15.75 m high water gauge (i.e. an assumed height the flood water will reach, which is used merely to aid in calculation of parameter figures for the panel 108 as listed below), each panel 108 is designed to withstand a maximum water pressure of 15.750 kg/m$^2$ (which actually works out to be about 1,000 kg/m$^2$ for over a height of 1.0 m), and have a rated panel deflection of only about 0.25934 mm at a maximum spacing of about 2500 mm for the supporting posts 104a-104c (i.e. the distance between the first supporting post 104a and the intermediate supporting post 104c, or between the second supporting post 104b and the intermediate supporting post 104c is about 2500 mm).

Further, each panel 108 comprises a male portion and a female portion respectively arranged at opposing lengthwise edges of said panel 108. The male and female portions are configured as elongated brackets, and each portion generally has a C-shaped cross-sectional area. When each panel 108 is installed between the supporting posts 104a-104c, the female portion is arranged to face the floor, and the male portion is thus arranged to face in the opposite direction. As seen in FIG. 1A, the first and second sets of panels 108a, 108b comprise a plurality of panels 108 in a cooperative arrangement. Specifically, each panel 108 is removably and cooperatively attachable to another panel 108 (by way of stacking at the lengthwise edges) using the associated male and female portions.

As an example, consider first, second and third panels 108 stacked together in the described order starting from the bottom. Accordingly, the male portion of the first panel 108 is received into the female portion of the second panel 108, whereas the male portion of the second panel 108 is then received into the female portion of the third panel 108, and so on as will be understood. In this manner, a selected number of panels 108a, 108b (as desired) are stackable one over the other to form the flood barrier 100 of varying height, depending on presumed/anticipated severity of an impending flood (which determines the height of the flood waters). That is, due to the modular and flexible arrangement the panels 108 are attachable to one another, not all the panels 108a, 108b need to be installed to form the flood barrier 100, which is therefore advantageous over conventional manually stackable flood gate systems that present no such flexibility.

Each panel 108 also includes a plurality of seals 118 arranged at all (lengthwise and widthwise) edges of the associated panel 108. Hence, the seals 118 are substantially longitudinal. It will be appreciated that the seals 118 arranged in the widthwise edges are transverse to the seals 118 arranged in the lengthwise edges. So the edges of the panel 108 are bounded by the seals 118, which are also TPV-type EPDM seals in this case. The seals 118 are arranged to be easily removable from the edges if necessary for maintenance. It is to be appreciated that the seals 118 of the panel 108 are not permanently mounted to the supporting posts 104a-104c to guard against potential damage by human activities, undesirably causing the seals 118 to become unserviceable when required. At the lengthwise edges, the seals 118 are concealed within the male and female portions of the associated panel 108, and visible only from the open ends of the male and female portions (which are configured as C-shaped brackets, as afore explained). So when the panels 108a, 108b are stacked together to form the flood barrier 100, the associated seals 118 (at the lengthwise edges) of a panel 108 compress against the associated seals 118 (at the lengthwise edges) of another panel 108 to provide a water-tight assembly.

In a rest condition, the seals 118 are arranged to have a generally D-shaped cross-sectional area, and have corrugated surfaces. Of course, it will be appreciated that not all the contact surfaces of the seals 118 need to be corrugated; indeed (in alternative embodiments) only certain essential surfaces of the seals 118 are configured to be corrugated. That is, the seals 118 may be partially corrugated. The corrugated surfaces are specifically configured to function as a plurality of barriers (acting against ingress of flood waters) in comparison to flat surfaces. Conventional seals with flat surfaces have only a single sealing face, which may be distorted or corrupted with usage overtime to undesirably allow ingress of waters. In this instance, the corrugated surfaces provide multiple layers of barriers (to the flood waters) when being exerted against the contact surfaces of the supporting posts 104a-104c or threshold plate 106, or one another (i.e. with specific reference to the seals 118 arranged at the lengthwise edges of the panels 108). Further, the D-shaped cross-sectional area of the seals 118 are advantageous when the seals 118 are compressed into tight corners of the supporting posts 104a-104c that interface with the threshold plate 106 to prevent entry of flood waters. It is also to be appreciated that when pressure of the flood waters push against the sets of panels 108a, 108b, the seals 118 then resiliently exert on the contact surfaces of the supporting posts 104a-104c resulting in an even tighter sealing with the supporting posts 104a-104c. Moreover, the corrugated surfaces also help to reduce friction when slotting the panel 108 into the supporting posts 104a-104c. In this aspect, it is to be appreciated that with the corrugated surfaces, an individual panel 108 (with a length of 2.5 m) is in fact able to slide down between the supporting posts 104a-104c without human intervention. Thus, the corrugated surfaces enable a better degree of sealing for a given amount of frictional force during the slotting process.

The flood barrier 100 also includes quick-snap fasteners (hereinafter fasteners) 200, which may optionally be used to removably secure the sets of panels 108a, 108b to the supporting posts 104a-104c by exerting a force downwardly in a direction towards the threshold plate 106 at the floor of the entrance 102 so as to compress the associated seals 118 (at the lengthwise edges) of abutting neighbouring panels 108 towards each other to provide a water-tight arrangement. A pair of fasteners 200 is required to secure a panel 108, but for each set of panels 108a, 108b, preferably only the pair of fasteners 200 at the topmost panel 108 of the associated set 108a, 108b is used. Hence, only a pair of fasteners 200 is used to secure the first set of panels 108a to the first supporting post 104a and the intermediate supporting post 104c, while another pair of fasteners 200 is used to secure the second set of panels 108b to the second supporting post 104b and the intermediate supporting post 104c. It is to be appreciated that for the base panel 108, usage of the fasteners 200 has an effect of compressing the seal 118 in the associated female portion towards the threshold plate 106. It is also highlighted that a pair of fasteners 200 is to be removably attached on the lengthwise edge of a panel 108 that is configured with the male portion. Specifically, the respective fasteners are positioned at opposing ends of the said lengthwise edge of the panel 108.

Each fastener 200 includes a lever portion 300 movably coupled to a hook portion 302, and a seat portion 304 (refer to FIG. 9B). Particularly, each fastener 200 is operable between two stable positions, an unlocked position and a locked position respectively. The lever portion 300 is arranged to have a resilient relationship with the hook portion 302, which will beneficially enable the fastener 200 to be operable between the stable unlocked and locked positions. A saddle portion 306 extends from the base of the seat portion 304, which allows the male portion of the panel 108 to be received into the saddle portion 306 when the fastener 200 is deployed on the panel 108. The hook portion 302 comprises a pair of elongated hook arms 302a 302b arranged on each side of the lever portion 300. Each hook arm 302a, 302b is preferable configured to be tapered in this instance but is not to be construed as limiting. In use, the hook portion 302 of the fastener 200 (in the unlocked position) is first latched to adjacent hooking plates 308 (which may be arranged to be chamfered) located on (opposing surfaces of) the associated supporting post 104a-104c to be secured to. Specifically, the tapered arrangement of the hook arms 302a, 302b enables anchoring with the chamfered hooking plates 308 to ensure a fully secure engagement. It is to be appreciated that each supporting post 104a-104c is configured, along its length on opposing surfaces, with a plurality of the hooking plates 308 which are arranged to be regularly spaced apart. Subsequently, the lever portion 300 is manually brought to rest on the seat portion 304, which requires some degree of force to be applied due to the resilient relationship of the lever portion 300 with the hook portion 302. When the lever portion 300 finally rests on the seat portion 304, the attachment between the hook portion 302 and the hooking plates 308 is tensioned and tighten, which consequently causes the fastener 200 to be locked in position (i.e. in the locked position) thereby securing the panel 108 to the said supporting post 104a-104c. Hence, the fastener 200 is beneficially configured to be able to quickly and easily lock-down the panel 108 in place without requiring lengthy turning or tightening processes normally associated with conventional solutions.

Figure 2C:
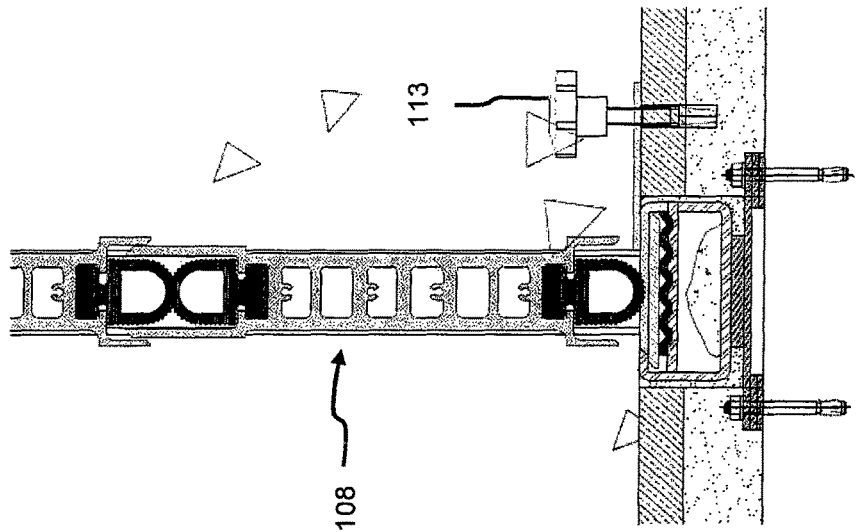
FIG. 2C is an enlarged view of portion F of FIG. 2A.
Figure 2B:
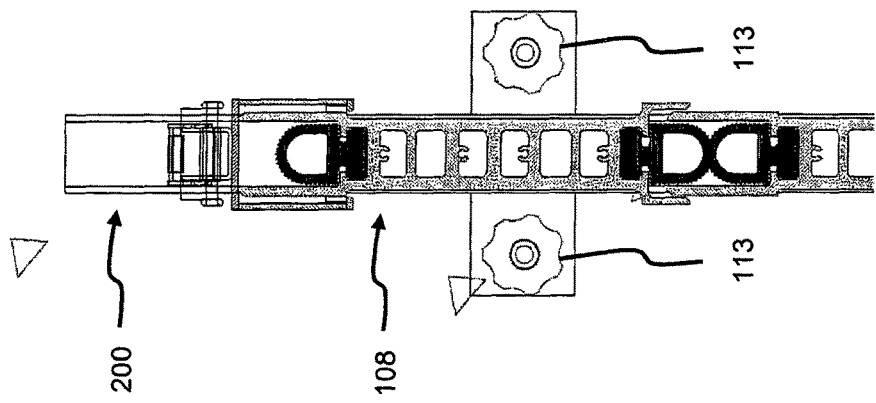
FIG. 2B is an enlarged view of portion E of FIG. 2A.
Figure 2A:
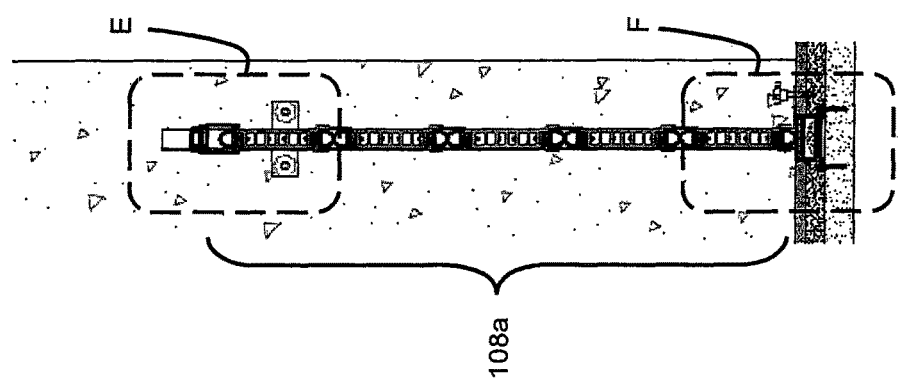
FIG. 2A is a cross-sectional view of the flood barrier taken along line C-C of FIG. 1A.
Figure 2D:
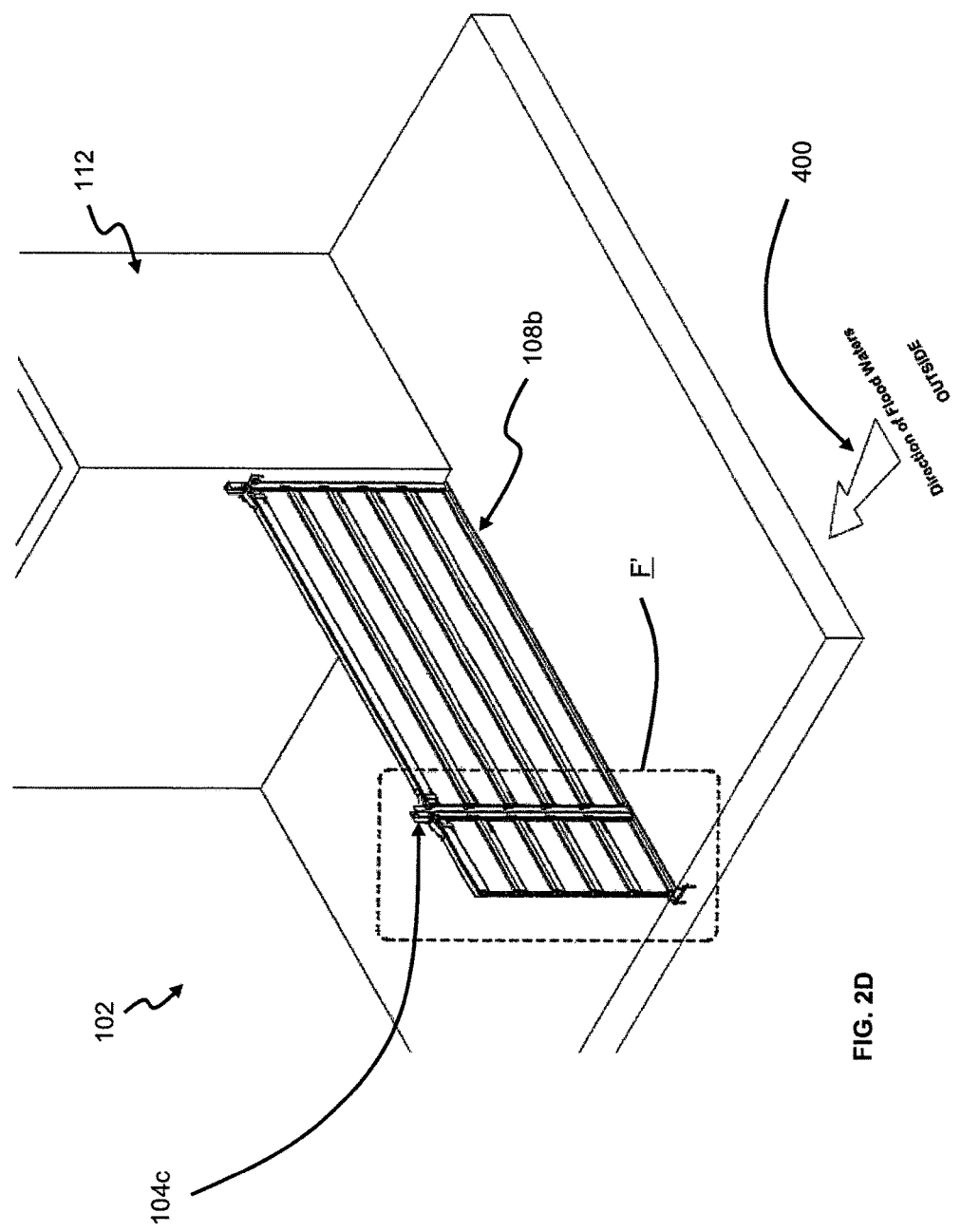
FIG. 2D is an isometric view from the direction of line C-C of FIG. 1A.

FIG. 2A is a cross-sectional view of the flood barrier 100 taken along line C-C of FIG. 1A, which is at the first set of panels 108a. FIG. 2B is an enlarged view of portion E of FIG. 2A, where the internal honeycombed-shaped structures of each panel 108 can clearly be seen. FIG. 2C then shows an enlarged view of portion F of FIG. 2A. Further, FIG. 2D is an isometric view from the direction of line C-C of FIG. 1A, and FIG. 2E is an enlarged view of portion F' of FIG. 2D.

Figure 3C:
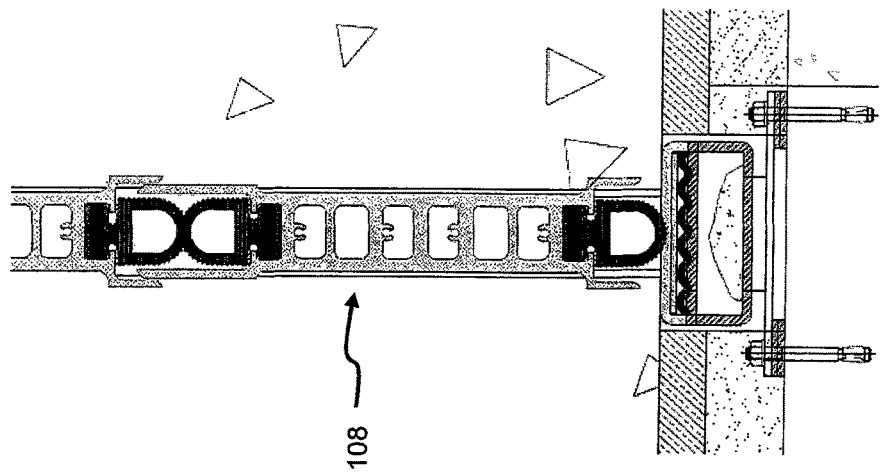
FIG. 3C is an enlarged view of portion H of FIG. 3A.
Figure 3B:
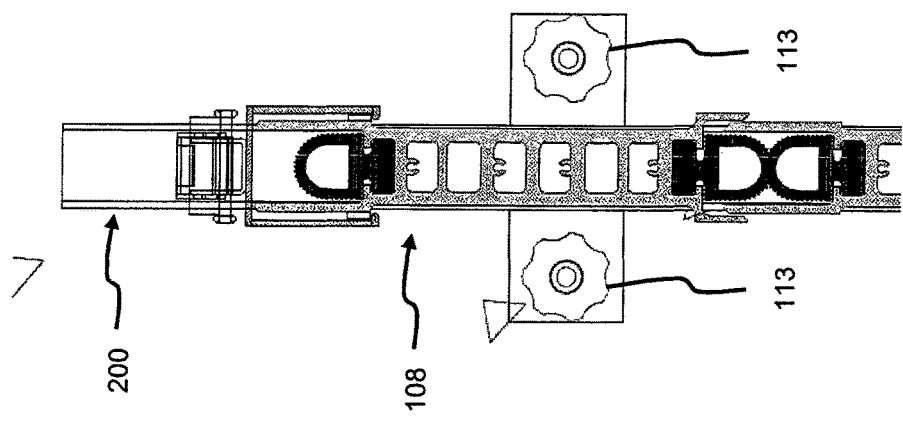
FIG. 3B is an enlarged view of portion G of FIG. 3A.
Figure 3A:
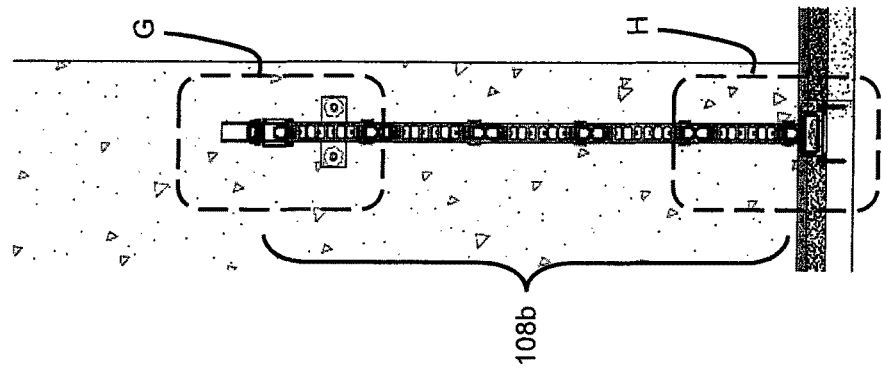
FIG. 3A is a cross-sectional view of the flood barrier taken along line B-B of FIG. 1A.

On the other hand, FIG. 3A is a cross-sectional view of the flood barrier 100 taken along line B-B of FIG. 1A, which is at the second set of panels 108b. FIG. 3B is an enlarged view of portion G of FIG. 3A, while FIG. 3C is an enlarged view of portion H of FIG. 3A.

Figure 4A:
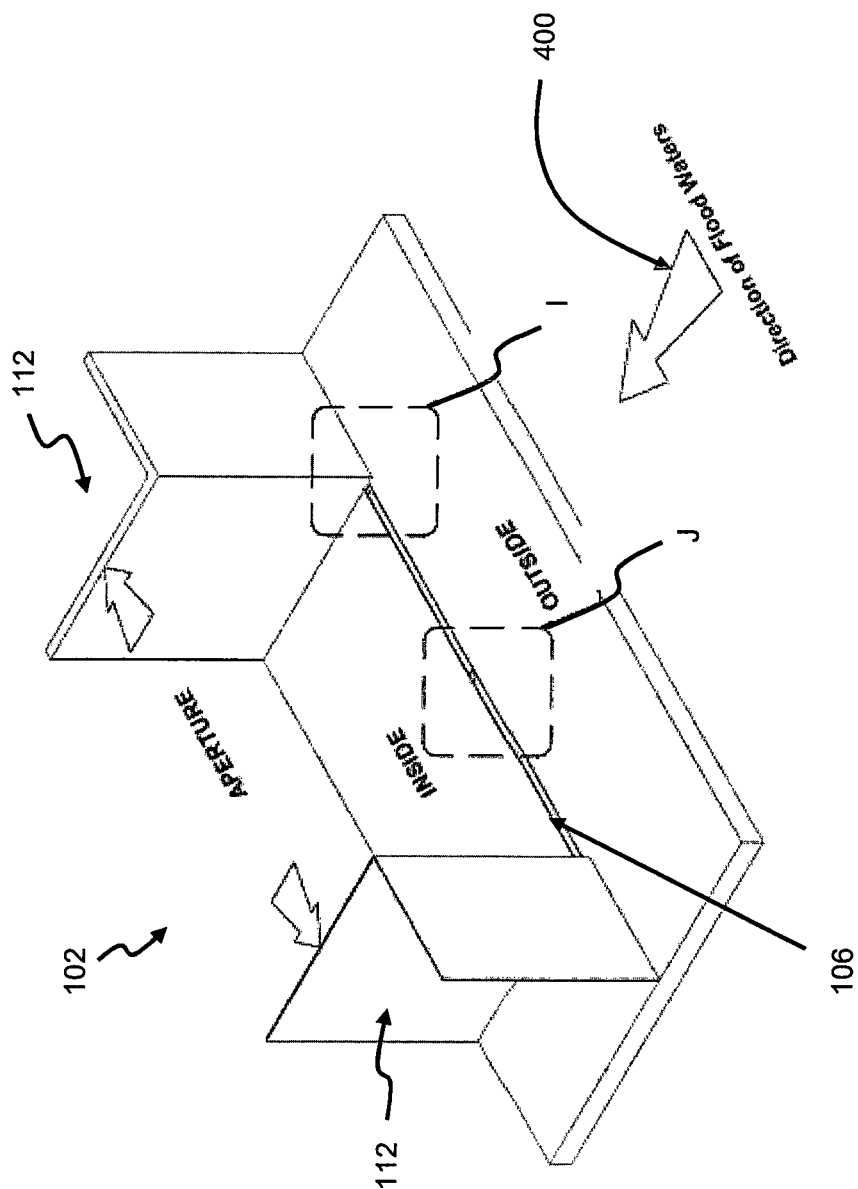
FIG. 4A shows a first step of a method of operating the flood barrier, in which the flood barrier is to be deployed at an entrance of a building.
Figure 4B:
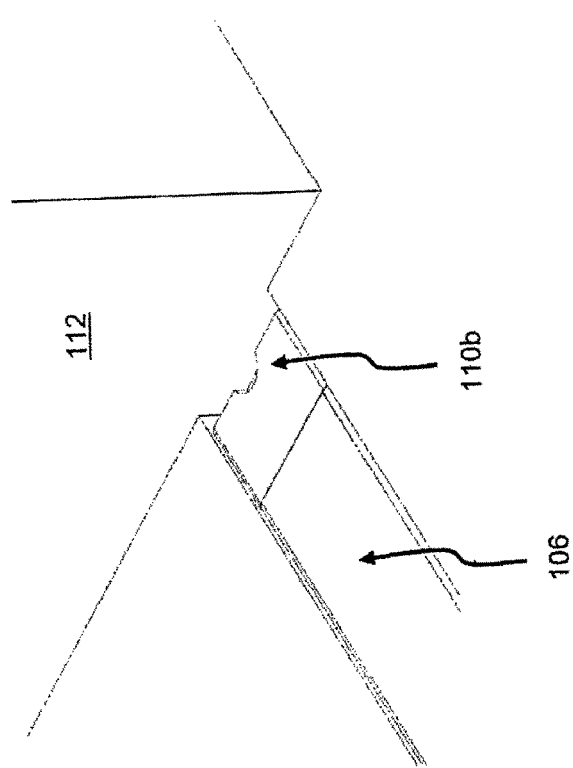
FIGS. 4B and 4C are respectively enlarged views of portions I and J of FIG. 4A.
Figure 4C:
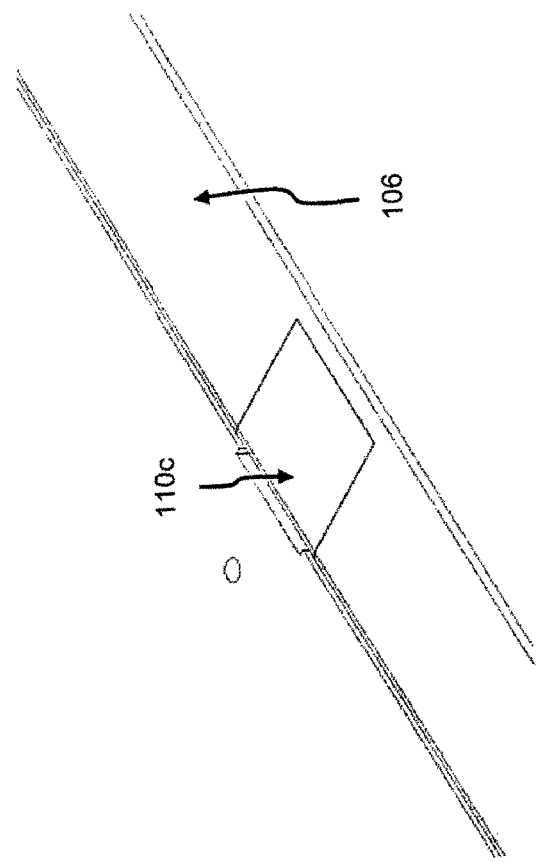

FIGS. 4A to 12 collectively show (respective steps of) a method of operating the flood barrier 100, and will be described in detail below. FIG. 4A shows a first step of said method, in which the floor of the entrance 102 is prior installed with the threshold plate 106 (which may be optional in certain embodiments). It is to be noted that an arrow (in FIG. 4A) labelled with reference numeral 400 indicates the direction of progress of the flood waters. FIGS. 4B and 4C respectively depict enlarged views of portions I and J of FIG. 4A, which respectively show the second cover plate 110b and intermediate cover plate 110c in a closed position.

Figure 5A:
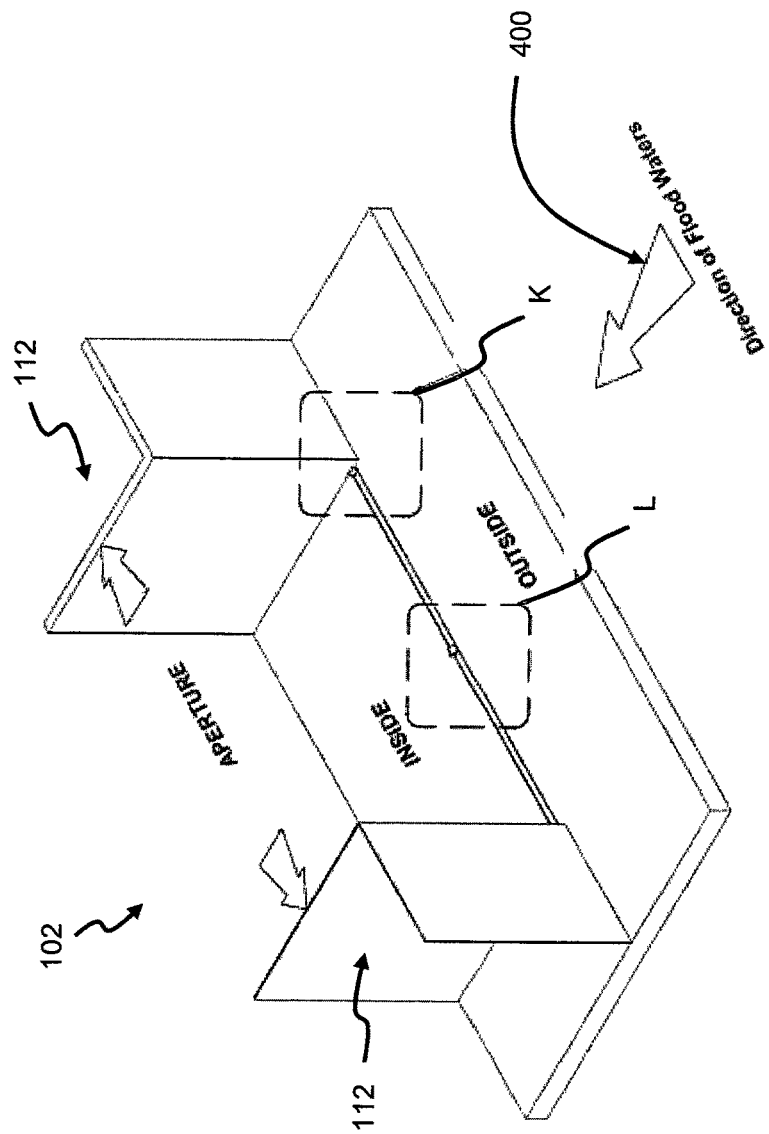
FIG. 5A shows a second step of said method of operating the flood barrier.
Figure 5C:
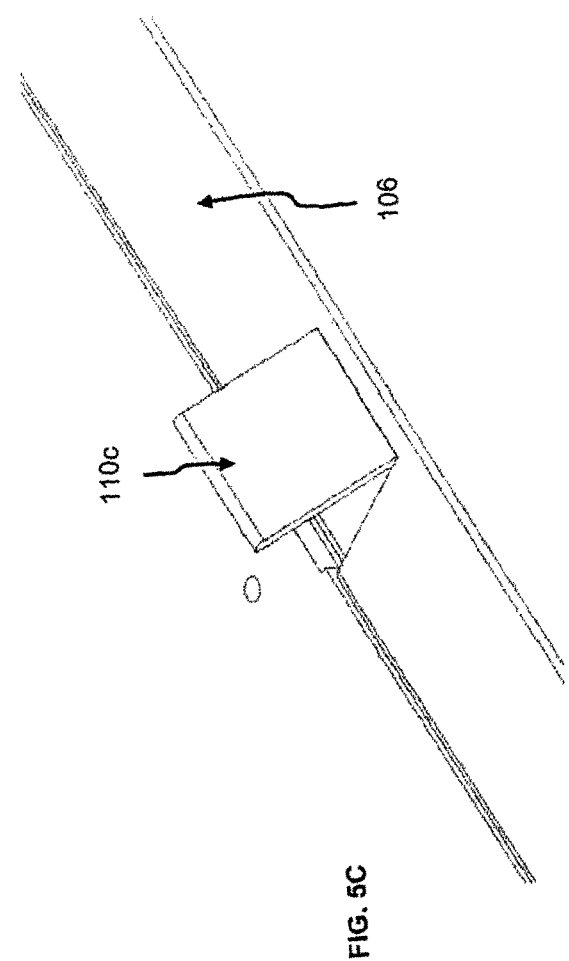
FIGS. 5B and 5C are respectively enlarged views of portions K and L of FIG. 5A.
Figure 5B:
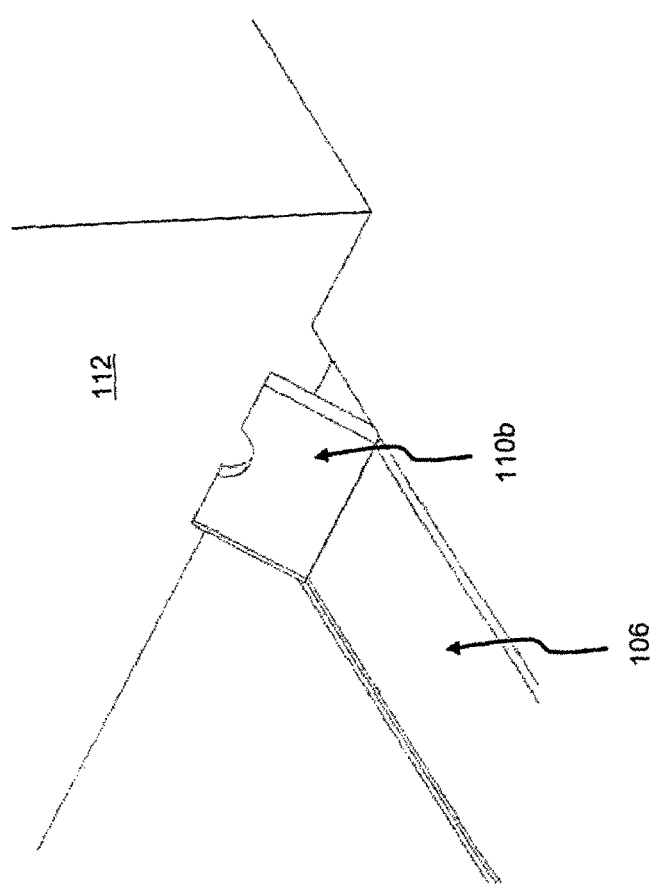
Figure 6A:
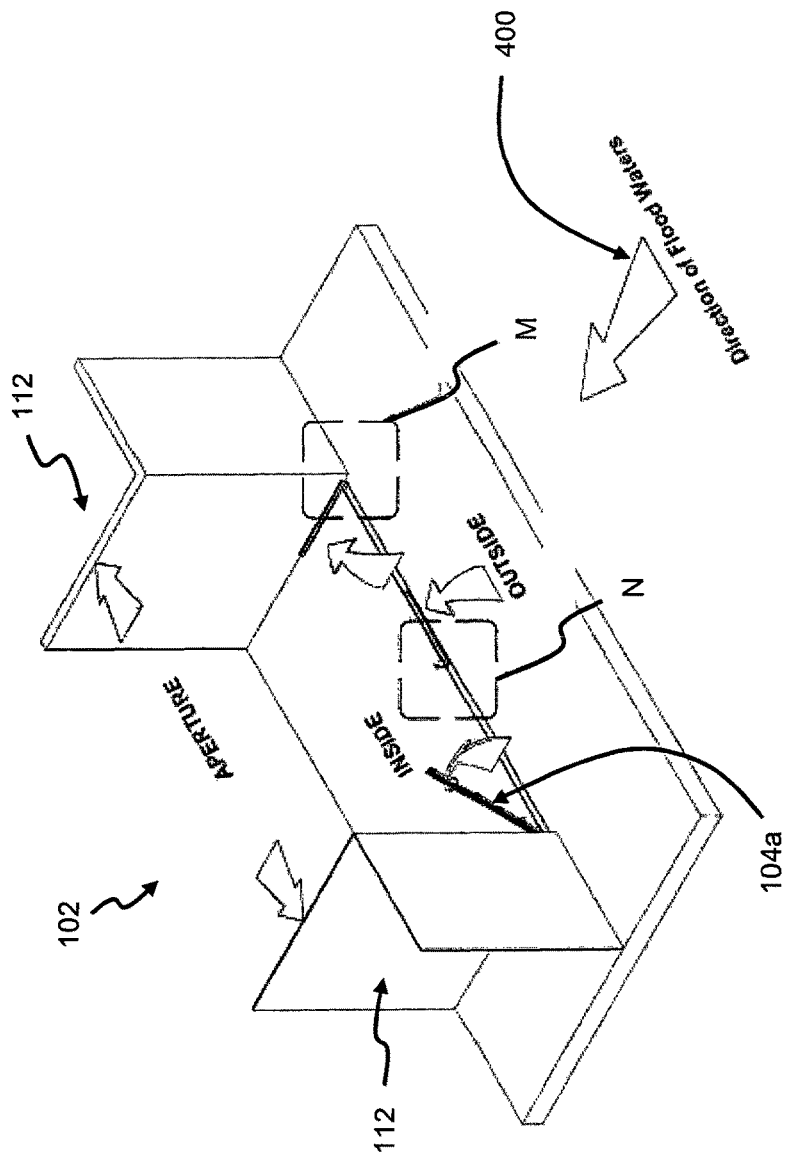
FIG. 6A still shows a second step of said method of operating the flood barrier, but based on an alternative embodiment.

FIG. 5A then shows a second step of said method. More specifically, FIGS. 5B and 5C respectively show enlarged views of portions K and L of FIG. 5A, which respectively show that the second cover plate 110b and intermediate cover plate 110c are now flipped open for removal to reveal the underlying recesses. It is also to be appreciated that in an alternative embodiment, the first, second cover plates 110a, 110b and intermediate cover plate 110c are each instead arranged to have a substantially rectangular shape to cover respective wider recesses underneath for accommodating larger supporting posts (not shown). The alternative configuration of the first, second cover plates and intermediate cover plate are respectively indicated in FIGS. 6A-6C with reference numerals 110a', 110b', 110c'. Hence, FIG. 6A still shows the second step of the said method, but however with reference to the alternative embodiment as afore explained. Accordingly FIGS. 6B and 6C respectively show enlarged views of portions M and N of FIG. 6A, which respectively depict the alternative second cover plate 110b' and intermediate cover plate 110c' flipped open for removal.

Figure 7C:
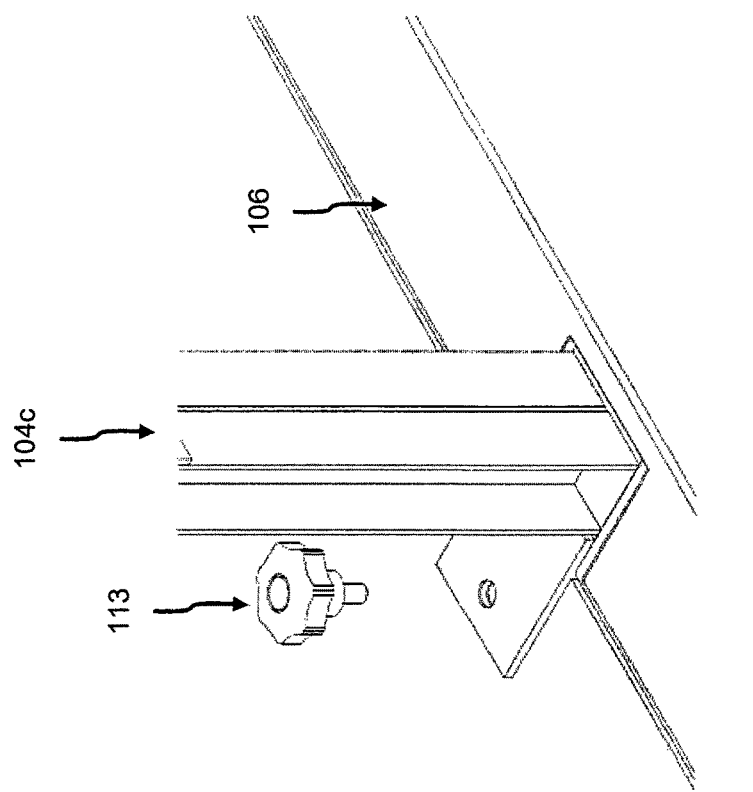
FIGS. 7B and 7C are respectively enlarged views of portions O and P of FIG. 7A.
Figure 7B:
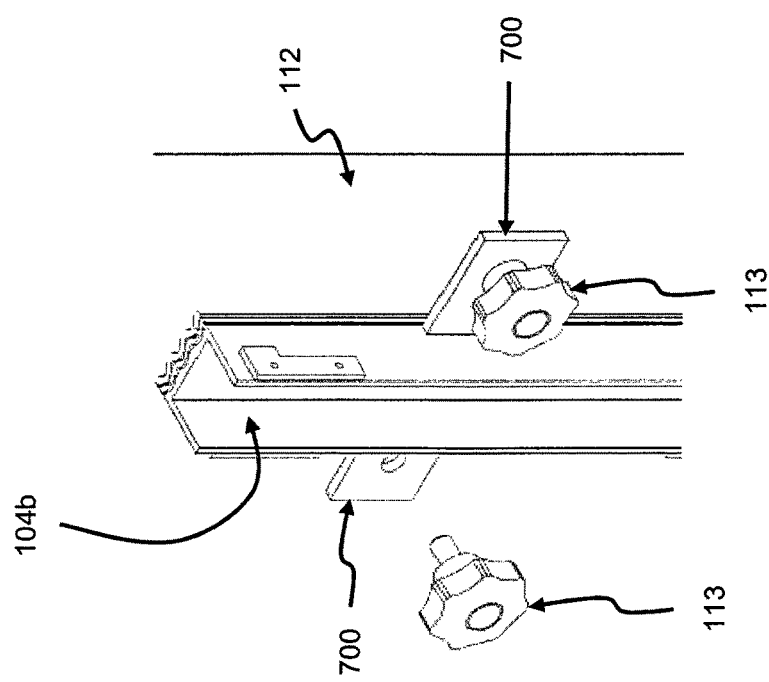

FIG. 7A shows a third step of said method, in which the first, second supporting posts 104a, 104b and intermediate supporting post 104c are mounted in respective positions to the walls 112 and floor of the entrance 102. FIG. 7B is an enlarged view of portion O of FIG. 7A, where the second supporting post 104b is shown being mounted to the wall 112 (via fixing brackets 700 of the second supporting post 104b) using two threaded cross-knobs 113. FIG. 7C shows an enlarged view of portion P of FIG. 7A, where the intermediate supporting post 104c is depicted being mounted to the floor using another cross-knob 113.

Figure 8:
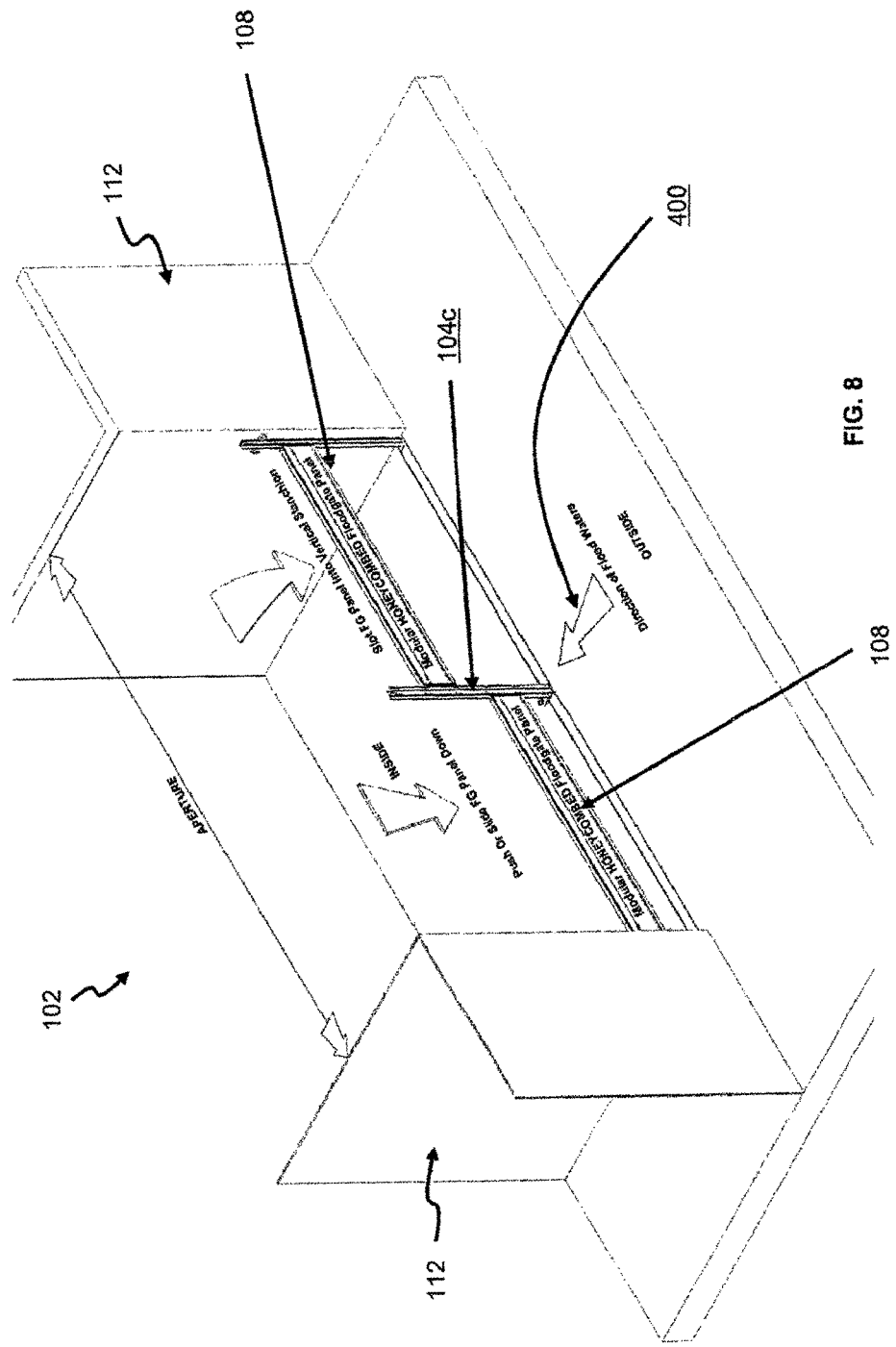
FIG. 8 shows a fourth step of said method of operating the flood barrier.

Once the first, second supporting posts 104a, 104b and intermediate supporting post 104c are securely mounted in respective positions, individual panels 108 are then sequentially slotted between the supporting posts 104a-104c in fourth and fifth steps of said method as depicted in FIGS. 8 and 9A. Needless to say, the slotted base panels 108 (of each set 108a, 108b) are arranged to abut the threshold plate 106 to ensure a water-tight arrangement. Once all the required panels 108 of the first and second sets of panels 108a, 108b are slotted in place between the supporting posts 104a-104c, respective pairs of the fasteners 200 are slotted in place at respective top most panels 108 of each set 108a, 108b. It is to be appreciated that merely for illustration simplicity, the fasteners 200 are depicted in FIGS. 9A, 10A and 11A as being slotted on the respective base panels 108 of the first and second sets of panels 108a, 108b, but however to be highlighted that the method in this instance is described with reference that the flood barrier 100 is to be fitted with the first and second sets of panels 108a, 108b (i.e. see FIG. 12).

FIGS. 9B and 9C then respectively show enlarged views of portions Q and R of FIG. 9A, particularly showing the fasteners 200 being readied for engaging with the associated hooking plates 308 of the respective supporting post 104a-104c. Particularly, the fasteners 200 are now arranged in the unlocked position.

FIG. 10A shows a sixth step of said method, where the details are illustrated in FIGS. 10B and 10C which are respectively enlarged views of portions S and T of FIG. 10A. Specifically, FIGS. 10B and 10C show that the associated elongated hook arms 302a 302b of the fasteners 200 being engaged with the hooking plates 308 of the respective supporting post 104a-104c.

FIG. 11A shows a seventh step of said method, where the details are shown in FIGS. 11B and 11C which are respectively enlarged views of portions U and V of FIG. 11A. In FIGS. 11B and 11C, it is shown that the fasteners 200 are locked in position (via bringing the respective lever portions 300 to rest on the respective seat portions 304 to thereby tension the hook portions 302) to secure the panels 108 to the supporting post 104a-104c. So, the fasteners 200 are now arranged in the locked position.

FIG. 12 shows an eighth step of said method, where the flood barrier 100 of a desired height is finally assembled (when the first and second sets of panels 108a, 108b are stacked in position) for deployment against the impending arrival of flood waters.

In summary, the method of operating the flood barrier 100 comprises arranging the supporting posts 104a-104c to be positioned at the entrance 102; and removably arranging the panels 108a, 108b intermediate a pair of the supporting posts 104a-104c to form the flood barrier 100, wherein each panel 108 includes a plurality of seals 118 having corrugated surfaces to interface with the supporting posts 104a-104c to provide a water-tight arrangement against entry of flood waters into the building. It is to be appreciated that the flood barrier 100 is not limited to using only the first and second supporting posts 104a, 104b with the intermediate supporting post 104c. Indeed, based on a width of a specific entrance (of a building) at where the flood barrier 100 is to be deployed, as many intermediate supporting posts 104c as required may be positioned in between the first and second supporting posts 104a, 104b, and each pair of supporting posts 104a-104c then receives a respective set of panels 108 in order to collectively form the flood barrier 100.

The method may also include arranging the fasteners 200 on opposing ends of the associated panels 108a, 108b (being worked on) and engaging the respective hook portions 302 with respective hooking plates 308 of the associated supporting posts 104a-104c; and operating the lever portions 300 to tension the hook portions 302 to secure the panels 108a, 108b to the supporting posts 104a-104c.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practicing the claimed invention. For example, the threshold plate 106 may not be necessary if the floor of the entrance is considered substantially flat. Also, usage of the fasteners 200 is optional and may be deployed only when required based on the circumstances. In addition, the flood barrier 100 may also be included as part of a large-scale flood control system (not shown). Further, the proposed flood barrier 100 requires at the minimum only one panel 108 to be assembled as the flood barrier (i.e. at least one panel 108 is needed).

The invention claimed is:

1. A flood barrier comprising:
   at least two supporting posts for positioning at an entrance of a building;
   at least one panel removably arranged intermediate a pair of the supporting posts to form the flood barrier; and
   a pair of fasteners arranged to removably secure the panel to the supporting posts,
   wherein the panel includes a plurality of seals arranged at opposing edges of the panel, said plurality of seals having corrugated surfaces to interface with the supporting posts to provide, upon compression of the plurality of seals, a water-tight arrangement against entry of flood waters into the building.

2. The flood barrier of claim 1, wherein the supporting posts are adapted to be removable.

3. The flood barrier of claim 1, wherein each seal has in a rest condition a generally D-shaped cross-sectional area.

4. The flood barrier of claim 3, wherein each seal is a Thermoplastic-Vulcanizers (TPV) Ethylene-Propylene-Diene-Monomer (EPDM) seal.

5. The flood barrier of claim 4, wherein each seal has an operating temperature range of between −40° C. and 130° C.

6. The flood barrier of claim 1, wherein each fastener includes a lever portion movably coupled to a hook portion,
   wherein in use the fasteners are arranged at opposing ends of the panel and the respective hook portions are engaged with respective hooking plates of the associated supporting posts, and the lever portions are operated to tension the hook portions to secure the panel to the supporting posts.

7. The flood barrier of claim 1, wherein the at least one panel includes a plurality of panels cooperatively arranged to form the flood barrier.

8. The flood barrier of claim 7, wherein each panel comprises a male portion and a female portion respectively arranged at second opposing edges of said panel which are parallel to a longitudinal axis thereof.

9. The flood barrier of claim 8, wherein the plurality of panels are each configured to be removably attachable to another of the panels using the associated male and female portions.

10. The flood barrier of claim 7, wherein the at least two supporting posts include first and second supporting posts, and at least one third supporting post for positioning intermediate the first and second supporting posts, whereby the panels are arranged to be received between pairs of the supporting posts to form the flood barrier.

11. The flood barrier of claim 10, wherein the third supporting post is adapted to be removable.

12. The flood barrier of claim 1, further comprising a second plurality of seals arranged at second opposing edges of the associated panel, said second plurality of seals having corrugated surfaces.

13. The flood barrier of claim 1, wherein the panel is internally configured to have honeycombed-shaped structures.

14. The flood barrier of claim 1, further comprising a threshold plate for positioning at the floor of the entrance.

15. The flood barrier of claim 1, wherein the at least two supporting posts include being arranged at the said entrance.

16. A method of operating a flood barrier which includes at least two supporting posts, at least one panel, and a pair of fasteners, the method comprising:
   arranging the two supporting posts to be positioned at an entrance of a building;
   removably arranging the panel intermediate a pair of the supporting posts to form the flood barrier; and
   arranging the pair of fasteners to removably secure the panel to the supporting posts,
   wherein the panel includes a plurality of seals arranged at opposing edges of the panel, said plurality of seals having corrugated surfaces to interface with the supporting posts to provide, upon compression of the plurality of seals, a water-tight arrangement against entry of flood waters into the building.

17. A flood barrier comprising:
   at least two supporting posts for positioning at an entrance of a building;
   at least one panel removably arranged intermediate a pair of the supporting posts to form the flood barrier; and
   a pair of fasteners, each fastener includes a lever portion movably coupled to a hook portion,
   wherein in use the fasteners are arranged at opposing ends of the panel and the respective hook portions are engaged with respective hooking plates of the associated supporting posts, and the lever portions are operated to tension the hook portions to secure the panel to the supporting posts.

18. The flood barrier of claim 17, wherein the at least two supporting posts include being arranged at said entrance.

19. A method of operating a flood barrier which includes at least two supporting posts, at least one panel and a pair of fasteners, each fastener includes a lever portion movably coupled to a hook portion, the method comprising:
   arranging the two supporting posts to be positioned at an entrance of a building;
   removably arranging at least one panel intermediate a pair of the supporting posts to form the flood barrier;
   arranging the fasteners at opposing ends of the panel and engaging the respective hook portions with respective hooking plates of the associated supporting posts; and
   operating the lever portions to tension the hook portions to secure the panel to the supporting posts.

20. A flood barrier comprising:
   at least two supporting posts for positioning at an entrance of a building;
   at least one panel removably arranged intermediate a pair of the supporting posts to form the flood barrier; and
   a pair of fasteners arranged to removably secure the at least one panel to the at least two supporting posts, the pair of fasteners being at a topmost position of the at least one panel;
   wherein the at least one panel includes a first plurality of seals arranged at first opposing edges of the panel and a second plurality of seals arranged at second opposing edges of the panel, the first and the second plurality of seals having corrugated surfaces;
   wherein the first plurality of seals are arranged to interface with the supporting posts and one of the second plurality of seals is arranged to interface with a floor of the entrance to provide, upon compression of the first and the second plurality of seals, a water-tight arrangement against entry of flood waters into the building; and
   wherein in use the pair of fasteners is arranged to exert a force downwardly on the at least one panel in a direction towards the floor of the entrance so as to compress the one of the second plurality of seals to provide the water-tight arrangement.

* * * * *